US011893936B2

(12) United States Patent
Wang et al.

(10) Patent No.: US 11,893,936 B2
(45) Date of Patent: Feb. 6, 2024

(54) PIXEL DRIVING CIRCUIT, DISPLAY PANEL, DRIVING METHODS, AND DISPLAY APPARATUS

(71) Applicant: BOE TECHNOLOGY GROUP CO., LTD., Beijing (CN)

(72) Inventors: Zhichong Wang, Beijing (CN); Fuqiang Li, Beijing (CN); Peng Liu, Beijing (CN); Jing Feng, Beijing (CN); Xinglong Luan, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 17/796,118

(22) PCT Filed: May 7, 2021

(86) PCT No.: PCT/CN2021/092180
§ 371 (c)(1),
(2) Date: Jul. 28, 2022

(87) PCT Pub. No.: WO2021/223743
PCT Pub. Date: Nov. 11, 2021

(65) Prior Publication Data

US 2023/0120765 A1 Apr. 20, 2023

(30) Foreign Application Priority Data

May 8, 2020 (CN) ......................... 202010382816.0

(51) Int. Cl.
*G09G 3/3233* (2016.01)
*G09G 3/3275* (2016.01)

(52) U.S. Cl.
CPC ......... *G09G 3/3233* (2013.01); *G09G 3/3275* (2013.01); *G09G 2300/0819* (2013.01);
(Continued)

(58) Field of Classification Search
CPC .................................................... G09G 3/3677
See application file for complete search history.

(56) References Cited

U.S. PATENT DOCUMENTS 9,965,097 B2 5/2018 Yang et al.
10,139,958 B2 * 11/2018 Ding ...................... H10K 59/40
(Continued)

FOREIGN PATENT DOCUMENTS

CN 103383837 A 11/2013
CN 104575389 A 4/2015
(Continued)

OTHER PUBLICATIONS

First Office Action for Chinese Patent Application No. 202010382816.0 issued by the Chinese Patent Office dated Dec. 10, 2020.

*Primary Examiner* — Nan-Ying Yang
(74) *Attorney, Agent, or Firm* — IP & T GROUP LLP

(57) ABSTRACT

A pixel driving circuit includes a driving sub-circuit, a signal writing sub-circuit, a compensation sub-circuit, a light-emitting control sub-circuit and an initialization sub-circuit. The signal writing sub-circuit is configured to write a voltage of a data signal terminal into the driving sub-circuit as a data voltage. The light-emitting control sub-circuit is configured to, in conjunction with the driving sub-circuit, drive a light-emitting device to emit light. The initialization sub-circuit is configured to transmit the voltage from the data signal terminal to the compensation sub-circuit as a reset voltage. The compensation sub-circuit is configured to transmit the reset voltage from the initialization sub-circuit to the driving sub-circuit to reset the driving sub-circuit.

19 Claims, 13 Drawing Sheets

(52) U.S. Cl.
CPC ............... *G09G 2300/0842* (2013.01); *G09G 2300/0861* (2013.01); *G09G 2310/0202* (2013.01); *G09G 2310/08* (2013.01); *G09G 2320/0233* (2013.01)

(56) References Cited

U.S. PATENT DOCUMENTS

| | | | | |
|---|---|---|---|---|
| 10,621,920 | B2 | 4/2020 | Gao et al. | |
| 10,644,089 | B2 | 5/2020 | Lee et al. | |
| 2004/0046920 | A1* | 3/2004 | Hayata | G02F 1/1345 349/149 |
| 2009/0243977 | A1* | 10/2009 | Chung | G09G 3/3233 345/76 |
| 2011/0279484 | A1 | 11/2011 | Han et al. | |
| 2015/0193045 | A1 | 7/2015 | Zhou et al. | |
| 2016/0343300 | A1 | 11/2016 | Wang et al. | |
| 2017/0221420 | A1* | 8/2017 | Zhu | G09G 3/3233 |
| 2017/0249904 | A1 | 8/2017 | Li et al. | |
| 2017/0269783 | A1 | 9/2017 | Yang et al. | |
| 2018/0190185 | A1 | 7/2018 | Ko et al. | |
| 2018/0211601 | A1 | 7/2018 | Chen et al. | |
| 2019/0172395 | A1 | 6/2019 | Yuan | |
| 2019/0279569 | A1 | 9/2019 | Zhao et al. | |
| 2020/0027402 | A1 | 1/2020 | Xiao et al. | |
| 2020/0035164 | A1 | 1/2020 | Qing | |
| 2021/0407401 | A1 | 12/2021 | Chen | |

FOREIGN PATENT DOCUMENTS

| | | | |
|---|---|---|---|
| CN | 105139804 | A | 12/2015 |
| CN | 105679236 | A | 6/2016 |
| CN | 106504703 | A | 3/2017 |
| CN | 106652907 | A | 5/2017 |
| CN | 107808630 | A | 3/2018 |
| CN | 108665852 | A | 10/2018 |
| CN | 108806596 | A | 11/2018 |
| CN | 108877674 | A | 11/2018 |
| CN | 105139804 | B | 12/2018 |
| CN | 109727570 | A | 5/2019 |
| CN | 111445853 | A | 7/2020 |
| CN | 112037715 | A | 12/2020 |
| KR | 10-1082234 | B1 | 11/2011 |

* cited by examiner

PIXEL DRIVING CIRCUIT, DISPLAY PANEL, DRIVING METHODS, AND DISPLAY APPARATUS

CROSS-REFERENCE TO RELATED APPLICATIONS

This application is a national phase entry under 35 USC 371 of International Patent Application No. PCT/CN2021/092180 filed on May 7, 2021, which claims priority to Chinese Patent Application No. 202010382816.0, filed on May 8, 2020, which are incorporated herein by reference in their entirety.

TECHNICAL FIELD

The present disclosure relates to the field of display technologies, and in particular, to a pixel driving circuit, a display panel, driving methods and a display apparatus.

BACKGROUND

Organic light-emitting diode (OLED) display apparatuses are one of hot researches in the field of display technologies. Compared with a liquid crystal display (LCD) apparatus, the OLED display apparatus has advantages such as low power consumption, low production cost, self-emission, wide viewing angle and quick response. The OLED display apparatus includes a plurality of sub-pixels, and each sub-pixel includes a pixel driving circuit and a light-emitting device. The pixel driving circuit drives the light-emitting device to emit light, so that the OLED display apparatus realizes display.

SUMMARY

In an aspect, a pixel driving circuit is provided. The pixel driving circuit includes a driving sub-circuit, a signal writing sub-circuit, a compensation sub-circuit, a light-emitting control sub-circuit and an initialization sub-circuit. The signal writing sub-circuit is coupled to a data signal terminal, a first control signal terminal and the driving sub-circuit. The signal writing sub-circuit is configured to, under control of a signal from the first control signal terminal, write a voltage of the data signal terminal into the driving sub-circuit as a data voltage. The light-emitting control sub-circuit is coupled to a light-emitting control terminal and the driving sub-circuit, and the light-emitting control sub-circuit is configured to be further coupled to a light-emitting device. The light-emitting control sub-circuit is further configured to, under control of a signal from the light-emitting control terminal, in conjunction with the driving sub-circuit, drive the light-emitting device to emit light. The initialization sub-circuit is coupled to the data signal terminal, a second control signal terminal and the compensation sub-circuit. The initialization sub-circuit is configured to, under control of a signal from the second control signal terminal, transmit a voltage from the data signal terminal to the compensation sub-circuit as a reset voltage. The compensation sub-circuit is further coupled to the driving sub-circuit and the first control signal terminal. The compensation sub-circuit is configured to, under the control of the signal from the first control signal terminal, transmit the reset voltage from the initialization sub-circuit to the driving sub-circuit to reset the driving sub-circuit.

In some embodiments, the compensation sub-circuit is further coupled to a third control signal terminal. The compensation sub-circuit is further configured to, under control of signals from the first control signal terminal and the third control signal terminal, write a threshold voltage of the driving transistor to the first end of the capacitor.

In some embodiments, the driving sub-circuit includes a driving transistor and a capacitor. A first end of the capacitor is coupled to a gate of the driving transistor and the compensation sub-circuit, and a second end of the capacitor is coupled to the signal writing sub-circuit. The signal writing sub-circuit is configured to, under the control of the signal from the first control signal terminal, write the voltage of the data signal terminal to the second end of the capacitor as the data voltage. The compensation sub-circuit is configured to, under the control of the signal from the first control signal terminal, transmit the reset voltage from the initialization sub-circuit to the gate of the driving transistor to reset the gate of the driving transistor.

In some embodiments, the driving sub-circuit is further coupled to a first voltage terminal. The light-emitting control sub-circuit is further coupled to a reference signal terminal and the second end of the capacitor, and is configured to be further coupled to an anode of the light-emitting device. The light-emitting control sub-circuit is further configured to, under the control of the signal of the light-emitting control terminal, transmit a reference voltage of the reference signal terminal to the second end of the capacitor, so as to drive the light-emitting device to emit light in conjunction with the driving sub-circuit.

In some embodiments, the driving sub-circuit is further coupled to a first voltage terminal. A first electrode of the driving transistor is coupled to the first voltage terminal, and a second electrode of the driving transistor is coupled to the light-emitting control sub-circuit.

In some embodiments, the signal writing sub-circuit includes a first transistor. A gate of the first transistor is coupled to the first control signal terminal, a first electrode of the first transistor is coupled to the data signal terminal, and a second electrode of the first transistor is coupled to the second end of the capacitor.

In some embodiments, the compensation sub-circuit is further coupled to a third control signal terminal. The compensation sub-circuit includes a second transistor and a third transistor. A gate of the second transistor is coupled to the first control signal terminal, a first electrode of the second transistor is coupled to the first end of the capacitor, and a second electrode of the second transistor is coupled to the initialization sub-circuit. A gate of the third transistor is coupled to the third control signal terminal, a first electrode of the third transistor is coupled to the second electrode of the second transistor, and a second electrode of the third transistor is coupled to a second electrode of the driving transistor.

In some embodiments, the light-emitting control sub-circuit is further coupled to a reference signal terminal. The light-emitting control sub-circuit includes a fourth transistor and a fifth transistor. A gate of the fourth transistor is coupled to the light-emitting control terminal, a first electrode of the fourth transistor is coupled to the reference signal terminal, and a second electrode of the fourth transistor is coupled to the second end of the capacitor. A gate of the fifth transistor is coupled to the light-emitting control terminal, a first electrode of the fifth transistor is coupled to a second electrode of the driving transistor, and a second electrode of the fifth transistor is coupled to an anode of the light-emitting device.

In some embodiments, the initialization sub-circuit includes a sixth transistor. A gate of the sixth transistor is coupled to the second control signal terminal, a first electrode of the sixth transistor is coupled to the data signal terminal, and a second electrode of the sixth transistor is coupled to the compensation sub-circuit.

In some embodiments, the light-emitting control sub-circuit is further coupled to a reference terminal. The signal writing sub-circuit includes a first transistor. The compensation sub-circuit includes a second transistor and a third transistor. The light-emitting control sub-circuit includes a fourth transistor and a fifth transistor. The initialization sub-circuit includes a sixth transistor. A gate of the first transistor is coupled to the first control signal terminal, a first electrode of the first transistor is coupled to the data signal terminal, and a second electrode of the first transistor is coupled to the second end of the capacitor. A gate of the second transistor is coupled to the first control signal terminal, a first electrode of the second transistor is coupled to the first end of the capacitor, and a second electrode of the second transistor is coupled to a second electrode of the sixth transistor. A gate of the third transistor is coupled to the third control signal terminal, a first electrode of the third transistor is coupled to the second electrode of the second transistor, and a second electrode of the third transistor is coupled to a second electrode of the driving transistor. A gate of the fourth transistor is coupled to the light-emitting control terminal, a first electrode of the fourth transistor is coupled to the reference signal terminal, and a second electrode of the fourth transistor is coupled to the second end of the capacitor. A gate of the fifth transistor is coupled to the light-emitting control terminal, a first electrode of the fifth transistor is coupled to the second electrode of the driving transistor, and a second electrode of the fifth transistor is coupled to an anode of the light-emitting device. A gate of the sixth transistor is configured to be coupled to the second control signal terminal, a first electrode of the sixth transistor is coupled to the data signal terminal, and the second electrode of the sixth transistor is coupled to the second electrode of the second transistor.

In some embodiments, the driving transistor, the first transistor, the second transistor, the third transistor, the fourth transistor, the fifth transistor and the sixth transistor are enhanced P-type thin film transistors.

In some embodiments, the light-emitting control terminal and the first control signal terminal are configured to transmit opposite signals.

In some embodiments, a type of the first transistor and the second transistor is different from a type of the fourth transistor and the fifth transistor.

In another aspect, a display panel is provided. The display panel includes a plurality of sub-pixels. Each sub-pixel includes a respective pixel driving circuit as described in any one of the above embodiments.

In some embodiments, the display panel further includes a plurality of switch controller groups, a source driver, a plurality of scanning signal lines, a plurality of first data signal lines and a plurality of second data signal lines. First control signal terminals of pixel driving circuits in a same row of sub-pixels are coupled to a same scanning signal line. Data signal terminals of pixel driving circuits in sub-pixels of odd-numbered rows in a same column are coupled to a same first data signal line. Data signal terminals of pixel driving circuits in sub-pixels of even-numbered rows in the same column are coupled to a same second data signal line. Each switch controller group includes a first switch and a second switch. An end of the first switch is coupled to a first data signal line, and another end of the first switch is coupled to the source driver. An end of the second switch is coupled to a second data signal line, and another end of the second switch is coupled to the source driver.

In yet another aspect, a display apparatus is provided. The display apparatus includes the display panel as described in any one of the above embodiments.

In yet another aspect, a method for driving a pixel driving circuit is provided. The pixel driving circuit includes: a driving sub-circuit, a signal writing sub-circuit, a compensation sub-circuit, a light-emitting control sub-circuit and an initialization sub-circuit. The signal writing sub-circuit is coupled to a data signal terminal, a first control signal terminal and the driving sub-circuit. The light-emitting control sub-circuit is coupled to a light-emitting control terminal, a reference signal terminal and the driving sub-circuit, and is configured to be further coupled to a light-emitting device. The initialization sub-circuit is coupled to the data signal terminal, a second control signal terminal and the compensation sub-circuit. The compensation sub-circuit is further coupled to the driving sub-circuit, the first control signal terminal and a third control signal terminal. The driving sub-circuit is further coupled to a first voltage terminal. The driving sub-circuit includes a driving transistor and a capacitor. The method has a plurality of frame periods. Each frame period includes an initialization phase, a scanning phase and a light-emitting phase. The initialization phase includes a plurality of row initialization periods. The scanning phase includes a plurality of row scanning periods. The light-emitting phase includes a plurality of row light-emitting periods. The method includes: in each of the plurality of row initialization periods: transmitting, by the initialization sub-circuit, a voltage of the data signal terminal to the compensation sub-circuit as a reset voltage under control of a turn-on signal from the second control signal terminal; and transmitting, by the compensation sub-circuit, the received reset voltage to a gate of the driving transistor under control of a turn-on signal transmitted by the first control signal terminal, so as to reset the gate of the driving transistor; in each of the plurality of row scanning periods: writing, by the compensation sub-circuit, a threshold voltage of the driving transistor and a first voltage of the first voltage terminal to a first end of the capacitor under control of turn-on signals respectively transmitted by the first control signal terminal and the third control signal terminal; writing, by the signal writing sub-circuit, a voltage of the data signal terminal to a second end of the capacitor as a data voltage under the control of the turn-on signal transmitted by the first control signal terminal; and in each of the plurality of row light-emitting periods: writing, by the light-emitting control sub-circuit, a reference voltage of the reference signal terminal to the second end of the capacitor under control of a turn-on signal transmitted by the light-emitting control terminal, so as to write a voltage difference between the data voltage and the reference voltage to the first end of the capacitor due to an coupling action and drive the light-emitting device to emit light.

In yet another aspect, a method for driving a display panel is provided. The display panel is the display panel as described in any one of the above embodiments. The method for driving the display panel has a plurality of control cycles. Each control cycle includes a first stage, a second stage and a third stage. The display panel further includes switch controller groups, a source driver, a plurality of scanning signal lines, a plurality of first data signal lines and a plurality of second data signal lines. Each switch controller group includes a first switch and a second switch. The compensation sub-circuit is further coupled to a third control signal terminal. The method for driving the display panel in a control cycle of the control cycles includes: in a first stage, inputting turn-on signals to the first control signal terminal and a second control signal terminal; in a first sub-stage of the first stage, controlling, by the source driver, a first switch to be turned off and a second switch to be turned on, and providing, by the source driver, an initial voltage to a second end of the first switch and a second end of the second switch; and in a second sub-stage of the first stage, controlling, by the source driver, the first switch to be turned on and the second switch to be turned off, and providing, by the source driver, a data voltage to the second end of the first switch and the second end of the second switch; in a second stage, inputting turn-on signals to the first control signal terminal and the third control signal terminal; in a first sub-stage of the second stage, controlling, by the source driver, the first switch to be turned off and the second switch to be turned on, and providing, by the source driver, the data voltage to the second end of the first switch and the second end of the second switch; and in a second sub-stage of the second stage, controlling, by the source driver, the first switch to be turned on and the second switch to be turned off, and providing, by the source driver, the initial voltage to the second end of the first switch and the second end of the second switch; and in a third stage, inputting, by the third control signal terminal, a turn-on signal; in a first sub-stage of the third stage, controlling, by the source driver, the first switch to be turned off and the second switch to be turned on, and providing, by the source driver, the initial voltage to the second end of the first switch and the second end of the second switch; and in a second sub-stage of the third stage, controlling, by the source driver, the first switch to be turned on and the second switch to be turned off, and providing, by the source driver, the data voltage to the second end of the first switch and the second end of the second switch.

In yet another aspect, another method for driving a display panel is provided. The display panel includes the display panel as described in any one of the above embodiments. The method for driving the display panel has a plurality of control cycles. Each control cycle includes a first stage, a second stage and a third stage. The display panel further comprises switch controller groups, a source driver, a plurality of scanning signal lines, a plurality of first data signal lines and a plurality of second data signal lines. Each switch controller group includes a first switch and a second switch. The compensation sub-circuit is further coupled to a third control signal terminal. The method for driving the display panel in a control cycle of the control cycles includes: in a first stage, inputting turn-on signals to a first control signal terminal and a second control signal terminal; in a first sub-stage of the first stage, controlling, by the source driver, a first switch to be turned off and a second switch to be turned on, and providing, by the source driver, an initial voltage to a second end of the first switch and a second end of the second switch; and in a second sub-stage of the first stage, controlling, by the source driver, the first switch to be turned on and the second switch to be turned off, and providing, by the source driver, a data voltage to the second end of the first switch and the second end of the second switch; in a second stage, inputting turn-on signals to the first control signal terminal and the third control signal terminal; in a first sub-stage of the second stage, controlling, by the source driver, the first switch to be turned on and the second switch to be turned off, and providing, by the source driver, the initial voltage to the second end of the first switch and the second end of the second switch; and in a second sub-stage of the second stage, controlling, by the source driver, the first switch to be turned off and the second switch to be turned on, and providing, by the source driver, the data voltage to the second end of the first switch and the second end of the second switch; and in a third stage, inputting a turn-on signal to the third control signal terminal; in a first sub-stage of the third stage, controlling, by the source driver, the first switch to be turned off and the second switch to be turned on, and providing, by the source driver, the initial voltage to the second end of the first switch and the second end of the second switch; and in a second sub-stage of the third stage, controlling, by the source driver, the first switch to be turned on and the second switch to be turned off, and providing, by the source driver, the data voltage to the second end of the first switch and the second end of the second switch.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person having ordinary skill in the art can obtain other drawings according to these accompanying drawings. In addition, the accompanying drawings in the following description may be regarded as schematic diagrams, but are not limitations on an actual size of a product, an actual process of a method and an actual timing of a signal involved in the embodiments of the present disclosure.

DETAILED DESCRIPTION

Figure 1A:
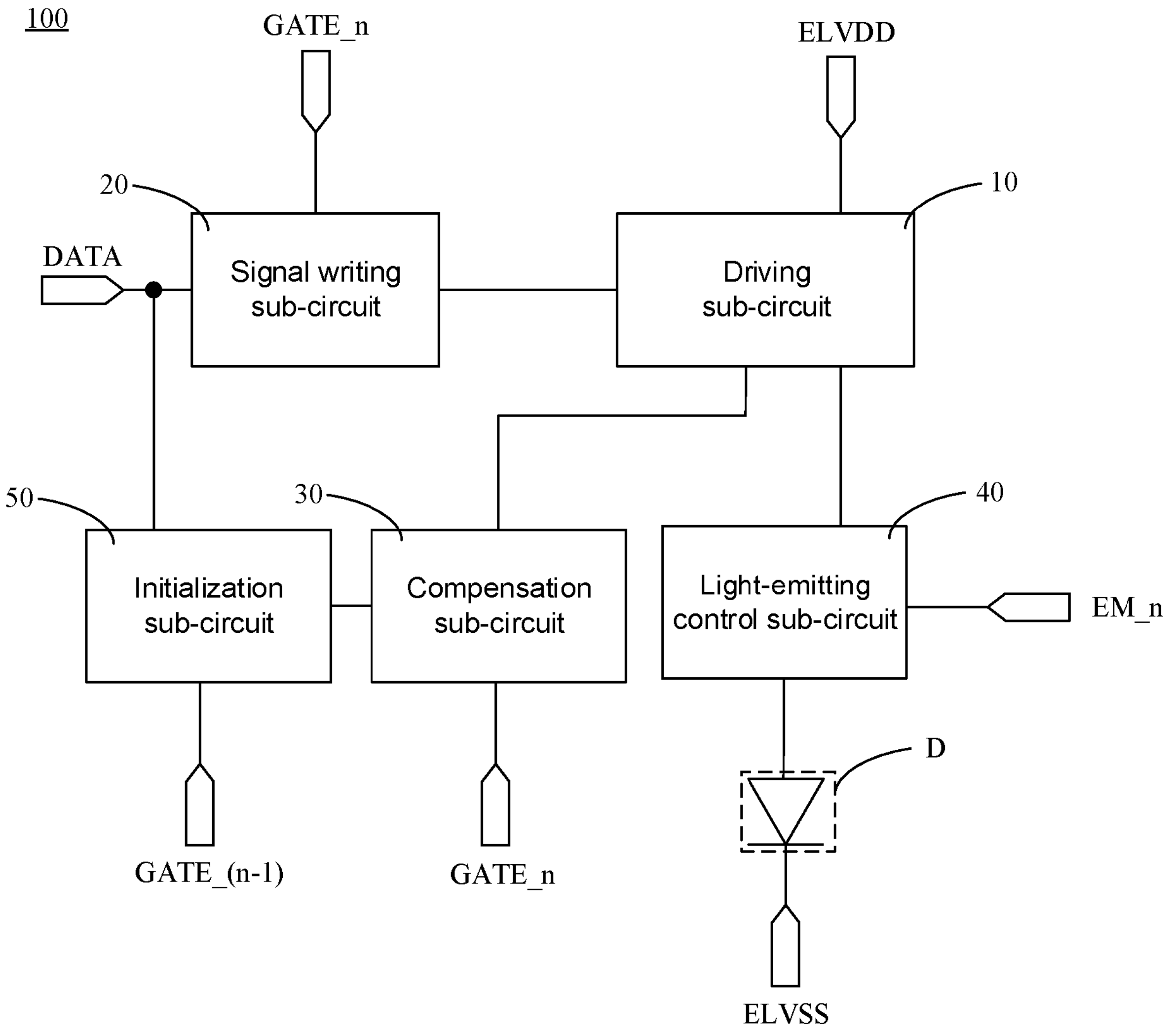
FIG. 1A is a structural diagram of a pixel driving circuit, in accordance with some embodiments of the present disclosure.

Technical solutions in some embodiments of the present disclosure will be described clearly and completely below with reference to the accompanying drawings. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, throughout the description and the claims, the term "comprise" and other forms thereof such as the third-person singular form "comprises" and the present participle form "comprising" are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representation of the above terms does not necessarily refer to the same embodiment(s) or examples(s). In addition, the specific features, structures, materials or characteristics may be included in any one or more embodiments or examples in any suitable manner.

Hereinafter, the terms such as "first" and "second" are used for descriptive purposes only, but are not to be construed as indicating or implying the relative importance or implicitly indicating the number of indicated technical features. Thus, the features defined with "first" and "second" may explicitly or implicitly include one or more of the features. In the description of the embodiments of the present disclosure, the term "a plurality of/the plurality of" means two or more unless otherwise specified.

Some embodiments may be described using the terms "coupled" and "connected" and their derivatives. For example, the term "connected" may be used in the description of some embodiments to indicate that two or more components are in direct physical or electrical contact with each other. For another example, the term "coupled" may be used in the description of some embodiments to indicate that two or more components are in direct physical or electrical contact. However, the term "coupled" or "communicatively coupled" may also mean that two or more components are not in direct contact with each other, but still cooperate or interact with each other. The embodiments disclosed herein are not necessarily limited to the content herein.

The phrase "applicable to" or "configured to" as used herein indicates an open and inclusive expression, which does not exclude devices that are applicable to or configured to perform additional tasks or steps.

In addition, the use of the phrase "based on" is meant to be open and inclusive, since a process, step, calculation or other action that is "based on" one or more of the stated conditions or values may, in practice, be based on additional conditions or values exceeding those stated.

As shown in FIG. 1A, some embodiments of the present disclosure provide a pixel driving circuit 100. The pixel driving circuit 100 includes a driving sub-circuit 10, a signal writing sub-circuit 20, a compensation sub-circuit 30, a light-emitting control sub-circuit 40 and an initialization sub-circuit 50.

The signal writing sub-circuit 20 is coupled to a data signal terminal DATA, a first control signal terminal GATE_n and the driving sub-circuit 10. The signal writing sub-circuit 20 is configured to: under control of a signal from the first control signal terminal GATE_n, write a voltage of the data signal terminal DATA into the driving sub-circuit 10 as a data voltage $V_{data}$.

The light-emitting control sub-circuit 40 is coupled to a light-emitting control terminal EM_n, the driving sub-circuit 10 and a light-emitting device D. The light-emitting control sub-circuit 40 is configured to: under control of a signal from the light-emitting control terminal EM_n, in conjunction with the driving sub-circuit 10, drive the light-emitting device D to emit light.

The initialization sub-circuit 50 is coupled to the data signal terminal DATA, a second control signal terminal GATE_(n−1) and the compensation sub-circuit 30. The initialization sub-circuit 50 is configured to: under control of a signal from the second control signal terminal GATE_(n−1), transmit a voltage of the data signal terminal DATA to the compensation sub-circuit 30 as a reset voltage $V_{int}$.

The compensation sub-circuit 30 is further coupled to the driving sub-circuit 10 and the first control signal terminal GATE_n. The compensation sub-circuit 30 is configured to: under the control of the signal from the first control signal terminal GATE_n, transmit the reset voltage transmitted to the compensation sub-circuit 30 to the driving sub-circuit 10, so as to reset the driving sub-circuit 10.

In the pixel driving circuit 100 provided in some embodiments of the present disclosure, the signal writing sub-circuit 20 and the initialization sub-circuit 50 are both coupled to the data signal terminal DATA. In an aspect, the data voltage $V_{data}$ may be written into the driving sub-circuit 10 by controlling the signal writing sub-circuit 20 to be turned on, so that the light-emitting device D may be driven to emit light in conjunction with the turning on of the light-emitting control sub-circuit 40. In another aspect, by controlling the initialization sub-circuit 50 and the compensation sub-circuit 30 to be turned on, the reset voltage $V_{int}$ may be transmitted to the driving sub-circuit 10, so that the driving sub-circuit 10 may be reset. In such a design, it may be possible to separately input the reset voltage $V_{int}$ and the data voltage $V_{data}$ to the pixel driving circuit 100 through one signal terminal in different time periods, which may reduce a number of signal terminals in the pixel driving circuit 100, and then simplify a design of the pixel driving circuit 100.

Figure 1B:
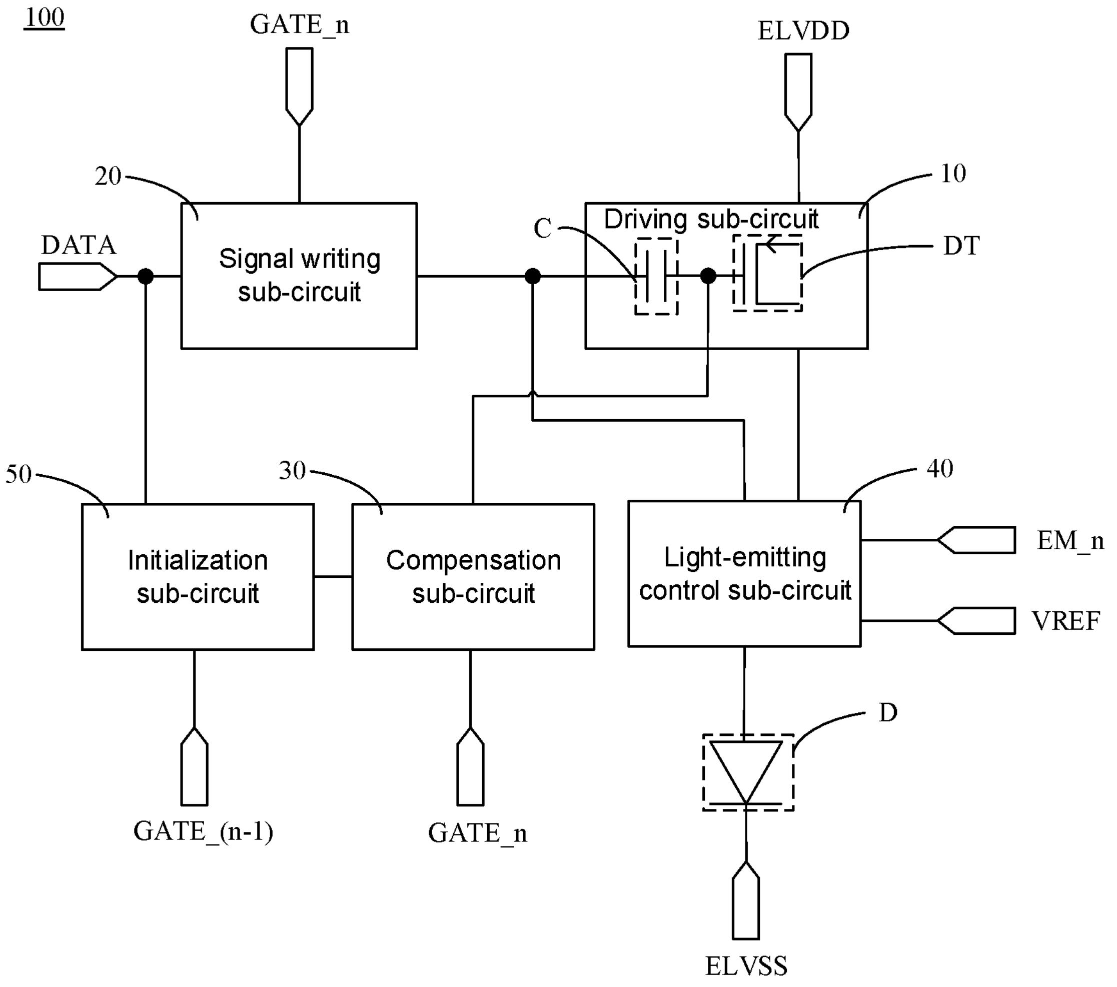
FIG. 1B is a structural diagram of another pixel driving circuit, in accordance with some embodiments of the present disclosure.

In some examples, as shown in FIG. 1B, the driving sub-circuit 10 includes a driving transistor DT and a capacitor C. A first end of the capacitor C is coupled to a gate of the driving transistor DT.

The signal writing sub-circuit 20 is configured to: under the control of the signal from the first control signal terminal GATE_n, write the voltage of the data signal terminal to a second end of the capacitor C as the data voltage $V_{data}$.

The compensation sub-circuit 30 is configured to: under the control of the signal from the first control signal terminal GATE_n, transmit the reset voltage $V_{int}$ from the initialization sub-circuit 50 to the gate of the driving transistor DT, so as to reset the gate of the driving transistor DT.

In some examples, with continued reference to FIG. 1B, the driving sub-circuit 10 is further coupled to a first voltage terminal ELVDD. The light-emitting control sub-circuit 40 is further coupled to an anode of the light-emitting device D and a reference signal terminal VREF. A cathode of the light-emitting device D is coupled to a second voltage terminal ELVSS. The light-emitting control sub-circuit 40 is configured to: under control of a signal from the light-emitting control terminal EM_n, transmit a reference voltage $V_{ref}$ of the reference signal terminal VREF to the second end of the capacitor C, so as to drive the light-emitting device D to emit light in conjunction with the driving sub-circuit 10.

It will be understood that, the data voltage $V_{data}$ and the reference voltage $V_{ref}$ are input to the second end of the capacitor C in different time periods, separately. In a case where the data voltage $V_{data}$ is different from the reference voltage $V_{ref}$, a voltage difference TP between the reference voltage $V_{ref}$ and the data voltage $V_{data}$ may be written to the first end of the capacitor C due to a coupling action thereof. A voltage of the first end of the capacitor C may be used to control the driving transistor DT to be turned on, which may drive the light-emitting device D to emit light in conjunction with the turning on of the light-emitting control sub-circuit 40.

Figure 1C:
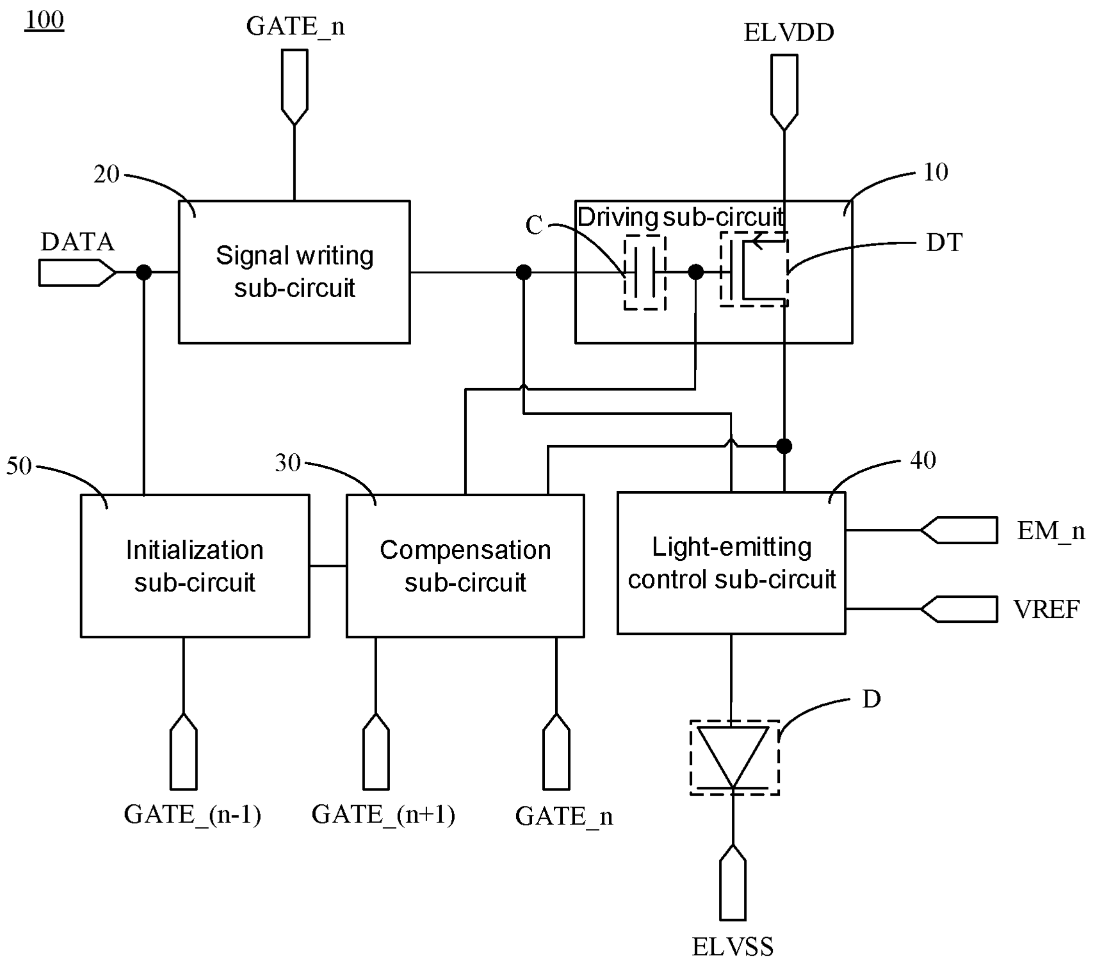
FIG. 1C is a structural diagram of yet another pixel driving circuit, in accordance with some embodiments of the present disclosure.

For example, as shown in FIG. 1C, the compensation sub-circuit 30 is further coupled to a third control signal terminal GATE_(n+1). The compensation sub-circuit 30 is further configured to: under control of signals from the first control signal terminal GATE_n and the third control signal terminal GATE_(n+1), write a threshold voltage $V_{th}$ of the driving transistor DT to the first end of capacitor C.

In this way, the compensation sub-circuit 30 is turned on by using the signals of the first control signal terminal GATE_n and the third control signal terminal GATE_(n+1), and the threshold voltage $V_{th}$ is compensated to the first end of capacitor C. Therefore, an influence of the threshold voltage $V_{th}$ on a light-emitting current of the light-emitting device D is eliminated, which ensures light-emitting stability of the light-emitting device D.

It will be noted that, the term "coupled" in some embodiments of the present disclosure may refer to a direct electrical connection or an indirect electrical connection through a certain device (e.g., a thin film transistor) between two elements.

In the pixel driving circuit 100 provided in some embodiments of the present disclosure, the reset voltage $V_{int}$ and the data voltage $V_{data}$ may be input into the pixel driving circuit 100 through the data signal terminal DATA in different time periods. The reset voltage $V_{int}$ may be used to initialize a voltage of the gate of the driving transistor DT of the driving sub-circuit 10 in the pixel driving circuit, so that the voltage of the gate of the driving transistor DT becomes $V_{int}$ after a row initialization period. In this way, it may be possible to enable the driving transistor DT to start to work from a same gate voltage bias state in row initialization periods of different cycles; and the data voltage $V_{data}$ may be used to make a voltage of the second end of the capacitor C of the driving sub-circuit 10 in the pixel driving circuit become $V_{data}$, which facilitates a subsequent control of light emission of the light-emitting device D. By using such a design, the reset voltage $V_{int}$ and the data voltage $V_{data}$ may be input into the pixel driving circuit through the one signal terminal in different time periods. Therefore, the number of the signal terminals in the pixel driving circuit 100 is reduced, and then the design of the pixel driving circuit 100 is simplified.

Figure 2:
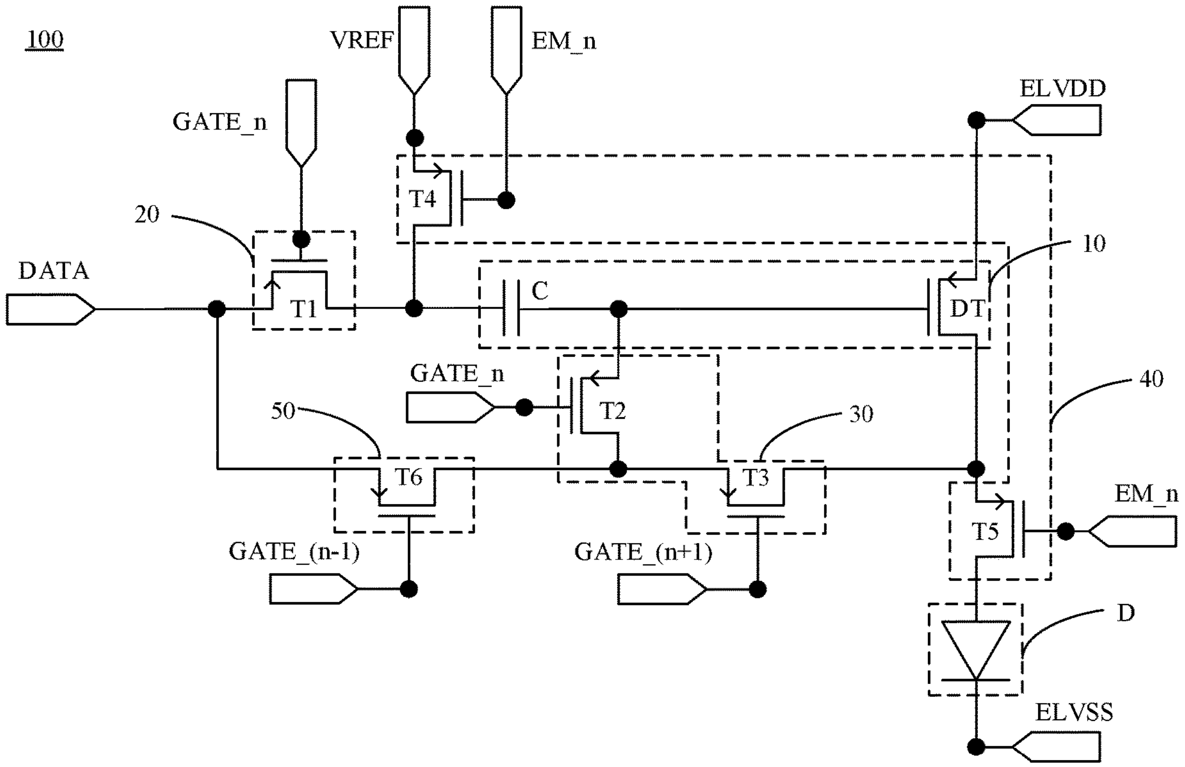
FIG. 2 is a structural diagram of yet another pixel driving circuit, in accordance with some embodiments of the present disclosure.

In some examples, as shown in FIGS. 1C and 2, a first electrode of the driving transistor DT is coupled to the first voltage terminal ELVDD, and a second electrode of the driving transistor DT is coupled to the light-emitting control sub-circuit 40.

In such a design, by controlling a voltage difference between the gate and the first electrode of the driving transistor DT, it may be possible to control whether the driving transistor DT is turned on, which may drive the light-emitting device D to emit light in conjunction with the light-emitting control sub-circuit 40.

In some examples, as shown in FIG. 2, the signal writing sub-circuit 20 includes a first transistor T1.

A gate of the first transistor T1 is coupled to the first control signal terminal GATE_n, a first electrode of the first transistor T1 is coupled to the data signal terminal DATA, and a second electrode of the first transistor T1 is coupled to the second end of the capacitor C.

In some examples, as shown in FIG. 2, the compensation sub-circuit 30 includes a second transistor T2 and a third transistor T3.

For example, a gate of the second transistor T2 is coupled to the first control signal terminal GATE_n, a first electrode of the second transistor T2 is coupled to the first end of the capacitor C, and a second electrode of the second transistor T2 is coupled to the initialization sub-circuit 50. A gate of the third transistor T3 is coupled to the third control signal terminal GATE_(n+1), a first electrode of the third transistor T3 is coupled to the second electrode of the second transistor T2, and a second electrode of the third transistor T3 is coupled to the second electrode of the driving transistor DT.

In such a design, by connecting the second transistor T2 and the third transistor T3 in series, it may be possible to avoid a fluctuation of a voltage signal written to the first end of the capacitor C due to leakage of the second transistor T2 coupled thereto, which effectively ensures that the light-emitting device D may be driven to emit light stably.

In some examples, as shown in FIG. 2, the light-emitting control sub-circuit 40 includes a fourth transistor T4 and a fifth transistor T5.

For example, a gate of the fourth transistor T4 is coupled to the light-emitting control terminal EM_n, a first electrode of the fourth transistor T4 is coupled to the reference signal terminal VREF, and a second electrode of the fourth transistor T4 is coupled to the second end of the capacitor C. A gate of the fifth transistor T5 is coupled to the light-emitting control terminal EM_n, a first electrode of the fifth transistor T5 is coupled to the second electrode of the driving transistor DT, and a second electrode of the fifth transistor T5 is coupled to the anode of the light-emitting device D.

In some examples, as shown in FIG. 2, the initialization sub-circuit 50 includes a sixth transistor T6.

A gate of the sixth transistor T6 is coupled to the second control signal terminal GATE_(n−1), a first electrode of the sixth transistor T6 is coupled to the data signal terminal DATA, and a second electrode of the sixth transistor T6 is coupled to the second electrode of the second transistor T2 of the compensation sub-circuit in 30.

In such a design, by connecting the second transistor T2 and the sixth transistor T6 in series, it may be possible to avoid a fluctuation of the voltage written to the first end of the capacitor C due to the leakage of the second transistor T2 coupled thereto, which effectively ensures that the light-emitting device D may be driven to emit light stably.

It will be noted that, for the transistors involved in some embodiments of the present disclosure, the first electrodes thereof may be drains, and the second electrodes thereof may be sources; or the first electrodes thereof may be the sources, and the second electrodes thereof may be the drains, which is not limited thereto. In addition, according to different conduction modes of transistors, the transistors may be classified into enhanced transistors and depletion-mode transistors; according to different substrates required to fabricate transistors, the transistors may be classified into thin film transistors (TFTs) and metal-oxide-semiconductor field-effect transistors (MOSFETs); and according to types of conduction channels of transistors, the transistors may be classified into P-type transistors and N-type transistors. In a case where a thin film transistor is a P-type transistor, a first electrode of the thin film transistor may be a source, and a second electrode of the thin film transistor may be a drain. For another example, in a case where the thin film transistor is an N-type transistor, the first electrode of the thin film transistor may be the drain, and the second electrode may be the source.

For ease of explanation, the pixel driving circuit 100 provided in some embodiments of the present disclosure is described by taking an example where the transistors are enhanced P-type thin film transistors. It will be noted that, embodiments of the present disclosure are not limited thereto. For example, one or more thin film transistors of the pixel driving circuit 100 provided in some embodiments of the present disclosure may be N-type transistors. In this case, it only needs to couple the electrodes of the thin film transistor of the selected type to corresponding elements with reference to the electrodes of corresponding thin film transistors in some embodiments of the present disclosure, and make corresponding voltage terminals provide corresponding high-level voltages or low-level voltages.

Figure 3:
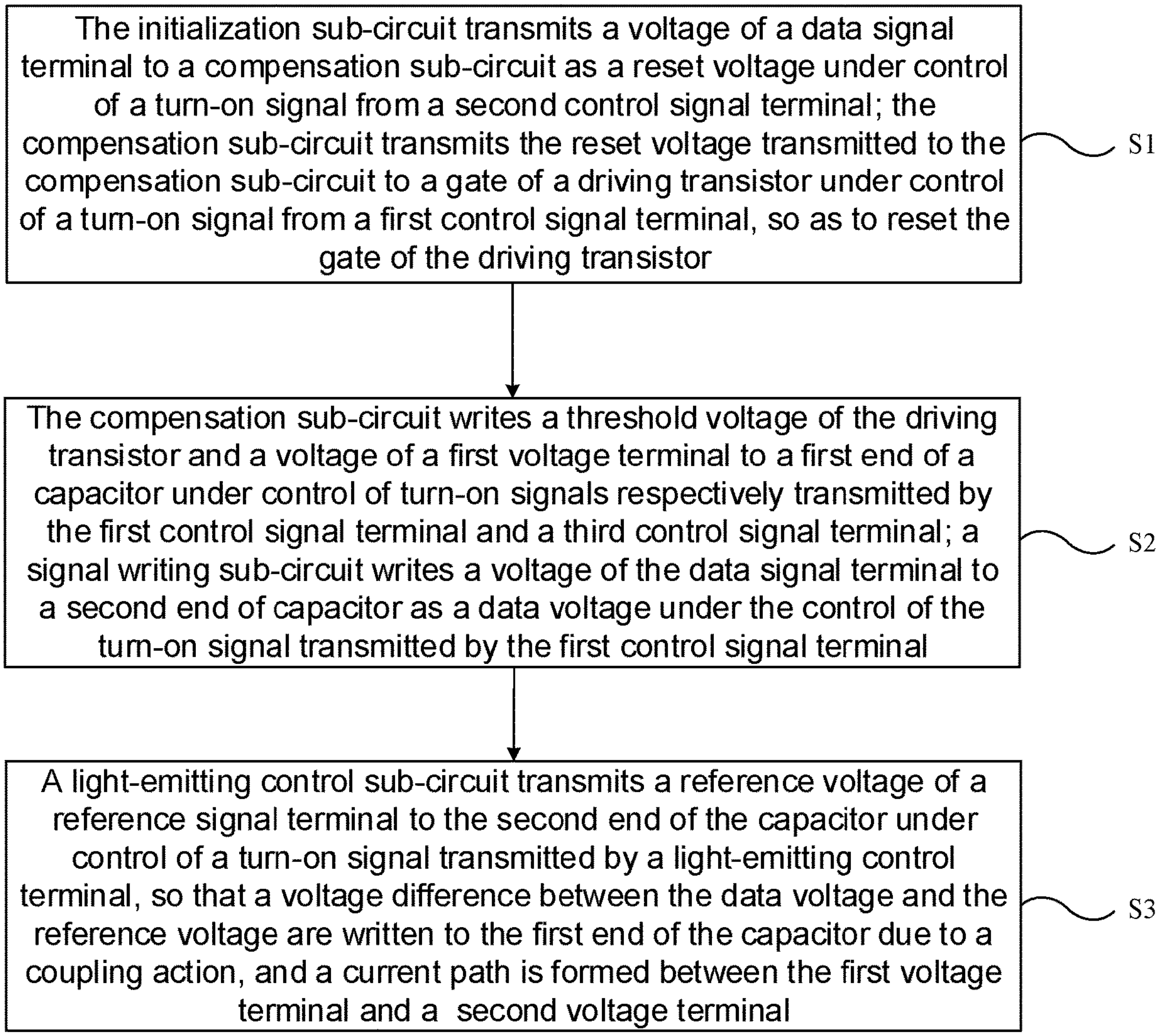
FIG. 3 is a flowchart of a method for driving a pixel driving circuit, in accordance with some embodiments of the present disclosure.

As shown in FIG. 3, some embodiments of the present disclosure provide a method for driving the pixel driving circuit 100. The method is configured to drive the pixel driving circuit 100 as described above. The method includes a plurality of frame periods.

Figure 4:
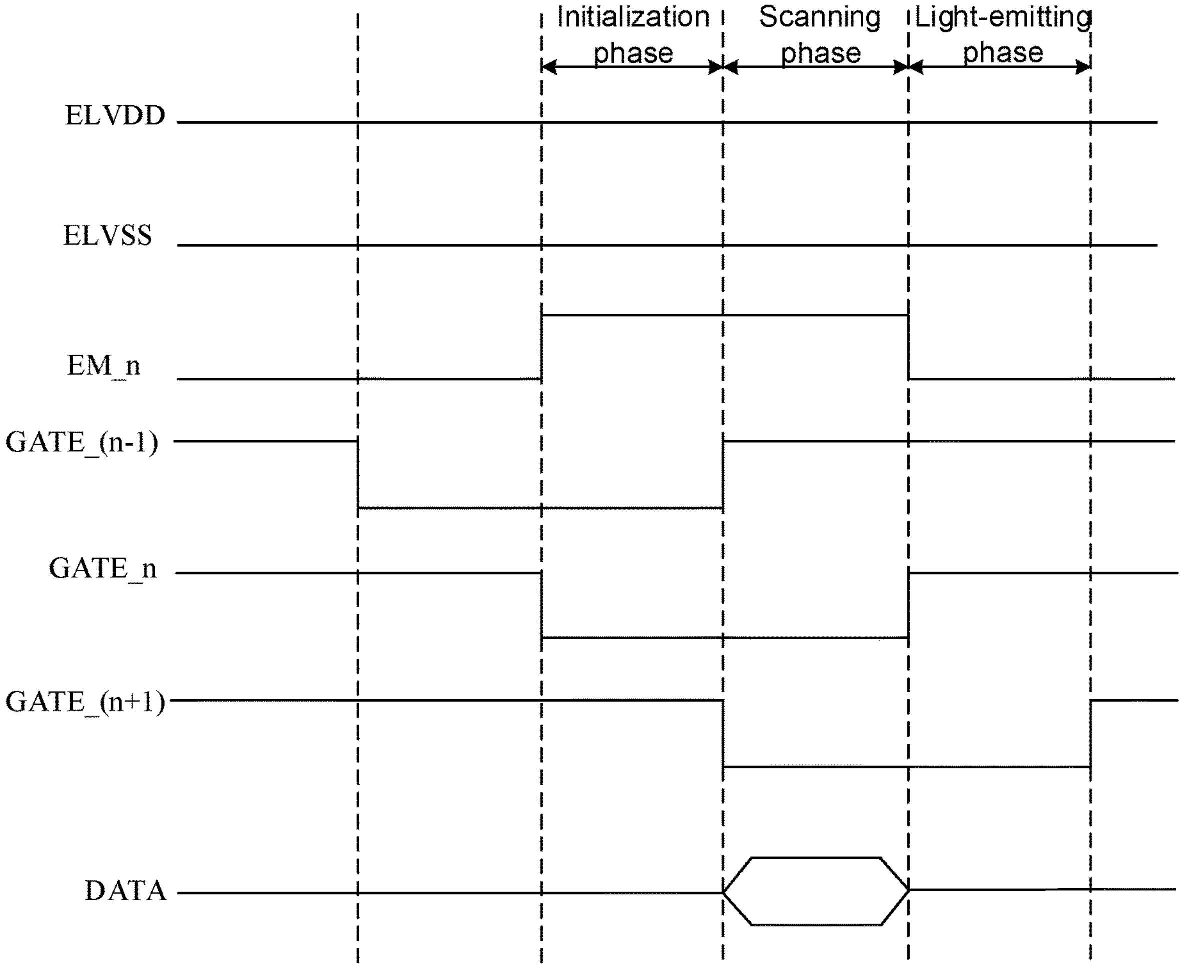
FIG. 4 is a timing diagram of a pixel driving method, in accordance with some embodiments of the present disclosure.

As shown in FIG. 4, each frame period includes an initialization phase, a scanning phase and a light-emitting phase. The initialization phase includes a plurality of row initialization periods. The scanning phase includes a plurality of row scanning periods. The light-emitting phase includes a plurality of row light-emitting periods.

Each of the plurality of row initialization periods includes the following steps.

In step S1, the initialization sub-circuit 50 transmits the voltage of the data signal terminal DATA to the compensation sub-circuit 30 as the reset voltage $V_{int}$ under control of a turn-on signal from the second control signal terminal GATE_(n−1); and the compensation sub-circuit 30, under control of a turn-on signal from the first control signal terminal GATE_n, transmits the reset voltage $V_{int}$ transmitted to the compensation sub-circuit 30 to the gate of the driving transistor DT, so as to reset the gate of the driving transistor DT.

Figure 5:
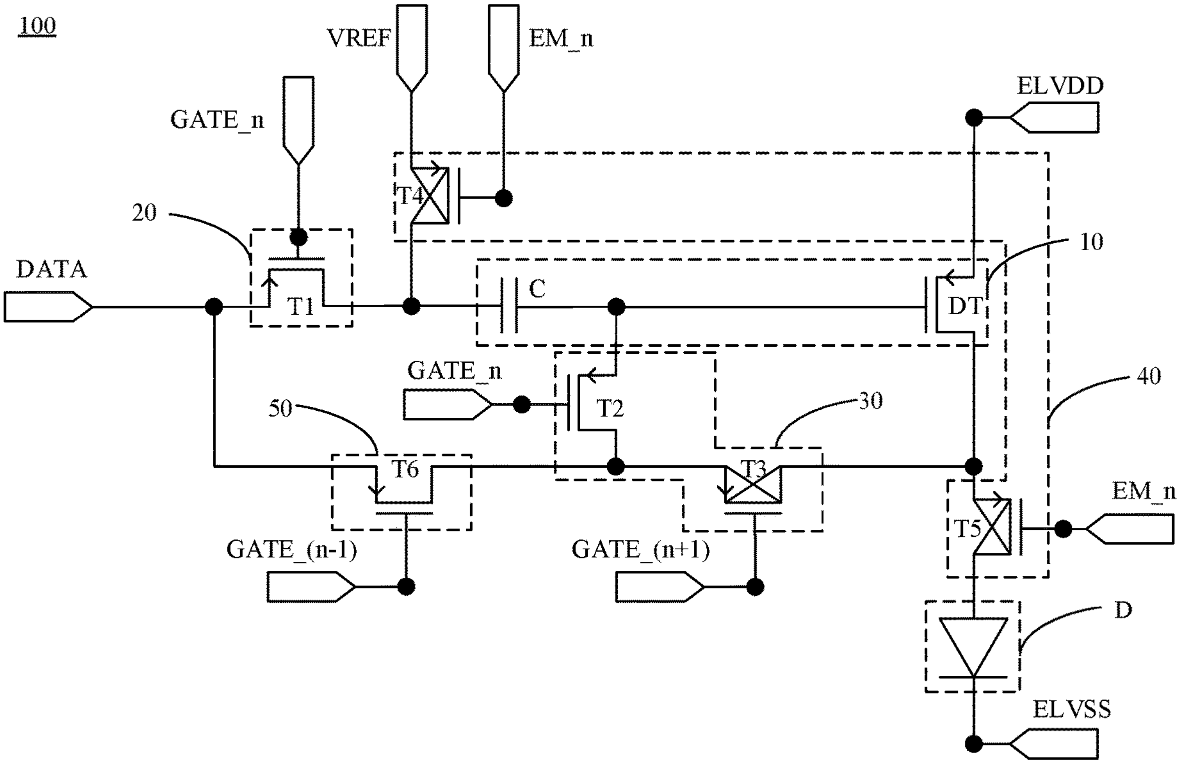
FIG. 5 is a structural diagram of the pixel driving circuit in FIG. 2 in a initialization phase, in accordance with some embodiments of the present disclosure.

For example, in conjunction with FIGS. 4 and 5, in the row initialization period, the low-level turn-on signals are input to the first control signal terminal GATE_n and the second control signal terminal GATE_(n−1), and high-level turn-off signals are input to the third control signal terminal GATE_(n+1) and the light-emitting control terminal EM_n. In this way, the first transistor T1, the second transistor T2 and the sixth transistor T6 may be controlled to be turned on; and the third transistor T3, the fourth transistor T4 and the fifth transistor T5 may be controlled to be turned off, simultaneously. At the same time, the reset voltage $V_{int}$ is input to the data signal terminal DATA. The reset voltage $V_{int}$ is input to the gate of the driving transistor DT through the sixth transistor T6 and the second transistor T2, so that the voltage of the gate of the driving transistor DT is $V_{int}$.

Each of the plurality of row scanning periods includes the following steps.

In step S2, under control of turn-on signals respectively transmitted by the first control signal terminal GATE_n and the third control signal terminal GATE_(n+1), the compensation sub-circuit 30 writes the threshold voltage of the driving transistor DT and a voltage ELvdd of the first voltage terminal ELVDD to the first end of the capacitor C; the signal writing sub-circuit 20 writes the voltage of the data signal terminal DATA to the second end of capacitor C as the data voltage $V_{data}$ under the control of the turn-on signal transmitted by the first control signal terminal GATE_n.

Figure 6:
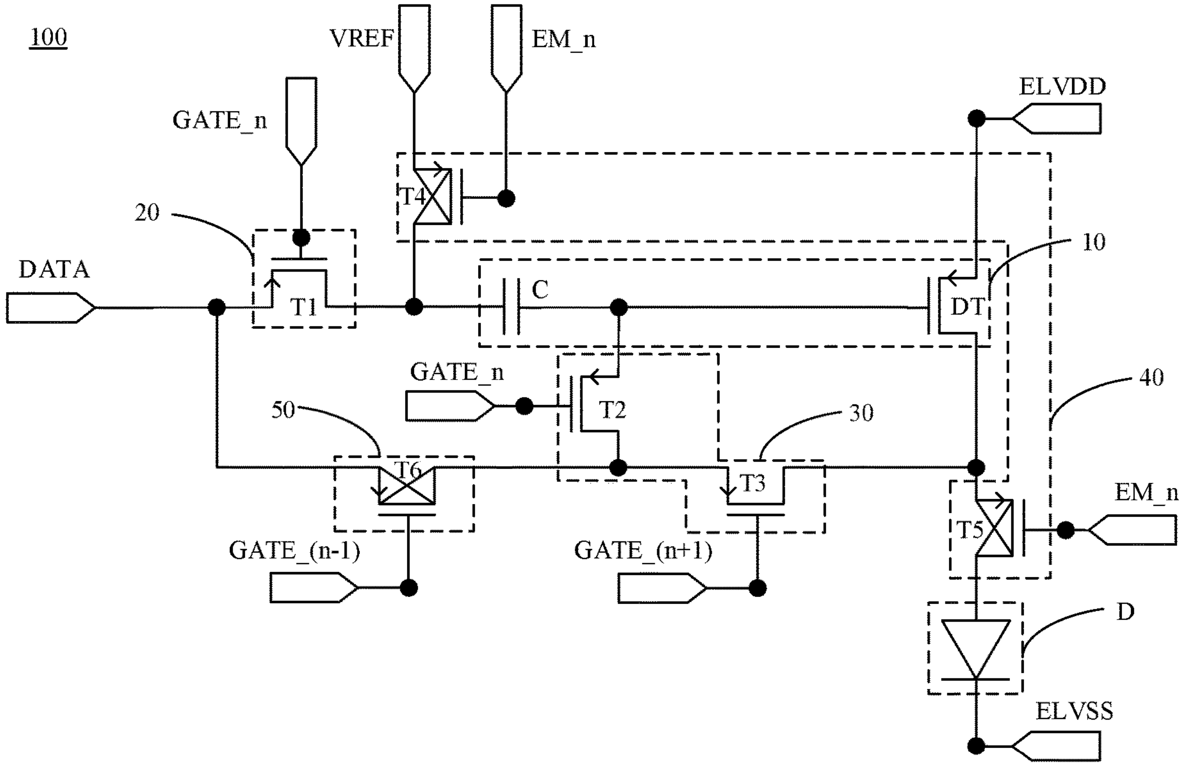
FIG. 6 is a structural diagram of the pixel driving circuit in FIG. 2 in a scanning phase, in accordance with some embodiments of the present disclosure.

For example, in conjunction with FIGS. 4 and 6, the low-level turn-on signals are input to the first control signal terminal GATE_n and the third control signal terminal GATE_(n+1), and high-level turn-on signals are input to the second control signal terminal GATE_(n−1) and the light-emitting control terminal EM_n. In this way, the first transistor T1, the second transistor T2 and the third transistor T3 may be controlled to be turned on; and the fourth transistor T4, the fifth transistor T5 and the sixth transistor T6 may be controlled to be turned off, simultaneously. At the same time, the data voltage $V_{data}$ is input to the data signal terminal DATA, and the voltage of the second end of the capacitor C is $V_{data}$; and the threshold voltage $V_{th}$ of the driving transistor DT and the voltage ELvdd of the first voltage terminal ELVDD are both written to the first end of the capacitor C, and the voltage of the first end of the capacitor C is a sum of ELvdd and $V_{th}$, i.e., ELvdd+$V_{th}$.

Each of the plurality of row light-emitting periods includes the following steps.

In step S3, under control of a turn-on signal transmitted by the light-emitting control terminal EM_n, the light-emitting control sub-circuit 40 transmits the reference voltage $V_{ref}$ of the reference signal terminal VREF to the second end of the capacitor C, so that the voltage difference TP between the data voltage $V_{data}$ and the reference voltage $V_{ref}$ are written to the first end of the capacitor C due to the coupling action, and a current path is formed between the first voltage terminal ELVDD and the second voltage terminal ELVSS.

When the current path between the first voltage terminal ELVDD and the second voltage terminal ELVSS is formed, a driving current is provided to the light emitting device D through the current path to drive the light emitting device D to emit light.

Figure 7:
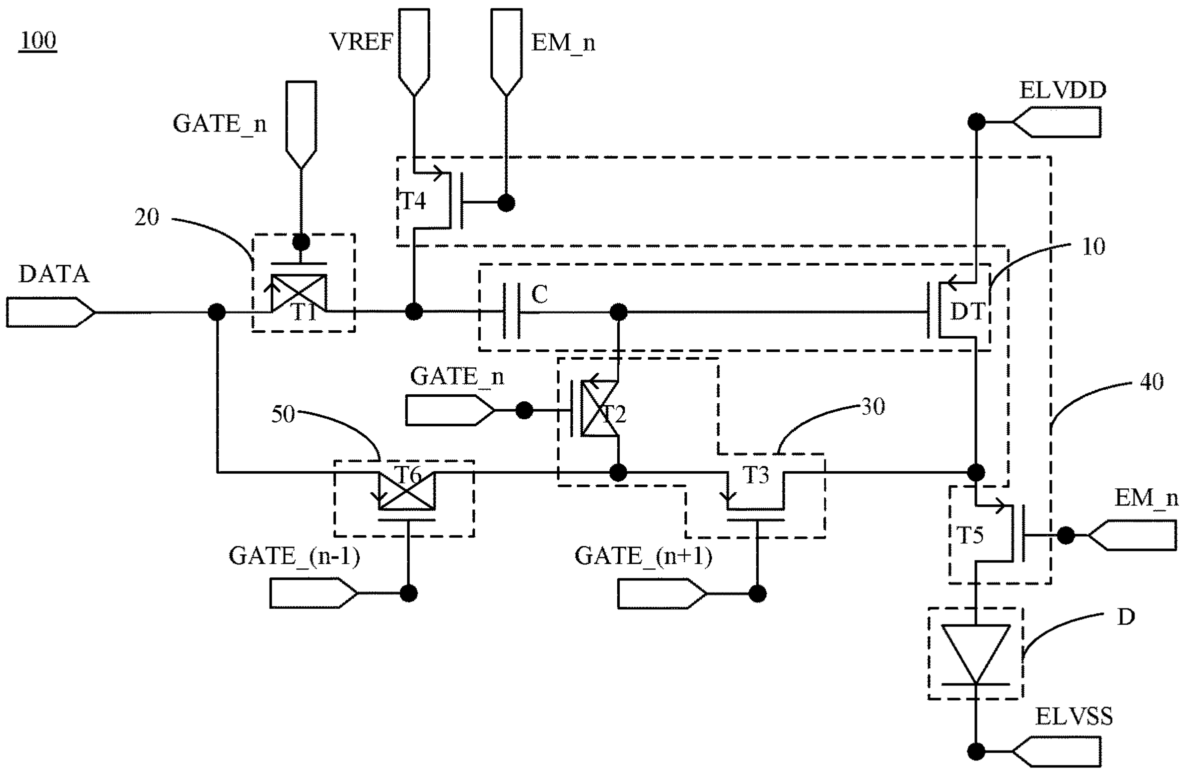
FIG. 7 is a structural diagram of the pixel driving circuit in FIG. 2 in a light-emitting phase, in accordance with some embodiments of the present disclosure.

For example, in conjunction with FIGS. 4 and 7, high-level turn-off signals are input to the first control signal terminal GATE_n and the second control signal terminal GATE_(n−1), and low-level turn-on signals are input to the third control signal terminal GATE_(n+1) and the light-emitting control terminal EM_n. In this way, the first transistor T1, the second transistor T2 and the sixth transistor T6 may be controlled to be turned off; and the third transistor T3, the fourth transistor T4 and the fifth transistor T5 may be controlled to be turned on, simultaneously. At the same time, the reference voltage $V_{ref}$ of the reference signal terminal VREF is input to the second end of the capacitor C. The voltage of the second end of the capacitor C jumps from $V_{data}$ to $V_{ref}$. A jump variation (i.e., a voltage difference) TP satisfies: $TP=V_{ref}-V_{data}$. The voltage of the first end of the capacitor C changes from $V_{th}$+ELvdd to $V_{th}$+ELvdd+$V_{ref}-V_{data}$ due to the coupling action. In this case, the voltage $V_g$ of the gate of the driving transistor DT satisfies: $V_g=V_{th}+$ ELvdd+$V_{ref}$−$V_{data}$ In this case, the current I flowing through the driving transistor DT satisfies:

$$I = \frac{1}{2K}(V_{gs} - V_{th})^2 = \frac{1}{2K}[(V_g - V_s) - V_{th})]^2 = \frac{1}{2K}(V_{ref} - V_{data})^2,$$

where K is a coefficient, and satisfies:

$$K = \frac{W}{L}C_{ox}\mu; \frac{W}{L}$$

is a width-to-length ratio of the driving transistor DT, $C_{ox}$ is a capacitance of a gate insulating layer of the driving transistor DT; μ is a carrier mobility of the driving transistor DT. It will be seen from the formula that, for a same pixel driving circuit 100, the current I (i.e., the light-emitting current) flowing through the driving transistor DT is only related to the reference voltage $V_{ref}$ and the data voltage $V_{data}$, but not to the threshold voltage $V_{th}$ of the driving transistor D. In this way, the threshold voltage $V_{th}$ of the driving transistor DT may be compensated, which may avoid a problem of uneven display due to a variation of the threshold voltage $V_{th}$ of the driving transistor DT. For example, the reference voltage $V_{ref}$ may be set to be less than the data voltage $V_{data}$, so that the light-emitting device D is driven to emit light.

On this basis, by inputting the reset voltage $V_{int}$ and the data voltage $V_{data}$ to the data signal terminal DATA in different time periods, it may not only be possible to initialize the pixel driving circuit 100, which is beneficial to ameliorate a problem of short-term afterimages in the display panel, but also may write the data signal $V_{data}$ into the capacitor C, which facilitates control of the light-emitting current. The pixel driving circuit 100 provided in some embodiments of the present disclosure may input the reset voltage $V_{int}$ and the data voltage $V_{data}$ to the pixel driving circuit 100 through the one terminal in different time periods, so that the number of the signal terminals in the pixel driving circuit 100 may be reduced, which simplifies the design of the pixel driving circuit 100.

In addition, with reference to FIG. 4, the signals transmitted by the light-emitting control terminal EM_n and the first control signal terminal GATE_n are opposite signals to each other. For example, in the initialization phase and the scanning phase in FIG. 4, the light-emitting control terminal EM_n transmits a high-level signal, while the first control signal terminal GATE_n transmits a low-level signal. Therefore, the light-emitting control terminal EM_n and the first control signal terminal GATE_n may be connected to a same gate driver on array (GOA) circuit. For example, two output terminals of the GOA circuit are respectively connected to the light-emitting control terminal EM_n and the first control signal terminal GATE_n, and the two output terminals of the GOA circuit respectively output two signals with opposite phases. For another example, a single output terminal of the GOA circuit is connected to both the light-emitting control terminal EM_n and the first control signal terminal GATE_n, and a type of the first transistor T1 and the second transistor T2 corresponding to the first control signal terminal GATE_n is different from a type of the fourth transistor T4 and the fifth transistor T5 corresponding to the light-emitting control terminal EM_n. For example, the first transistor T1 and the second transistor T2 are both P-type TFTs, and the fourth transistor T4 and the fifth transistor T5 are both N-type TFTs. For another example, the first transistor T1 and the second transistor T2 are both N-type TFTs, and the fourth transistor T4 and the fifth transistor T5 are both P-type TFTs.

In this way, by coupling the light-emitting control terminal EM_n and the first control signal terminal GATE_n to the same GOA circuit, it may be possible to simplify an arrangement of the GOA circuit and reduce an area occupied by a bezel where the GOA circuit is located, which is conductive to narrowing the bezel of the display panel.

Figure 8A:
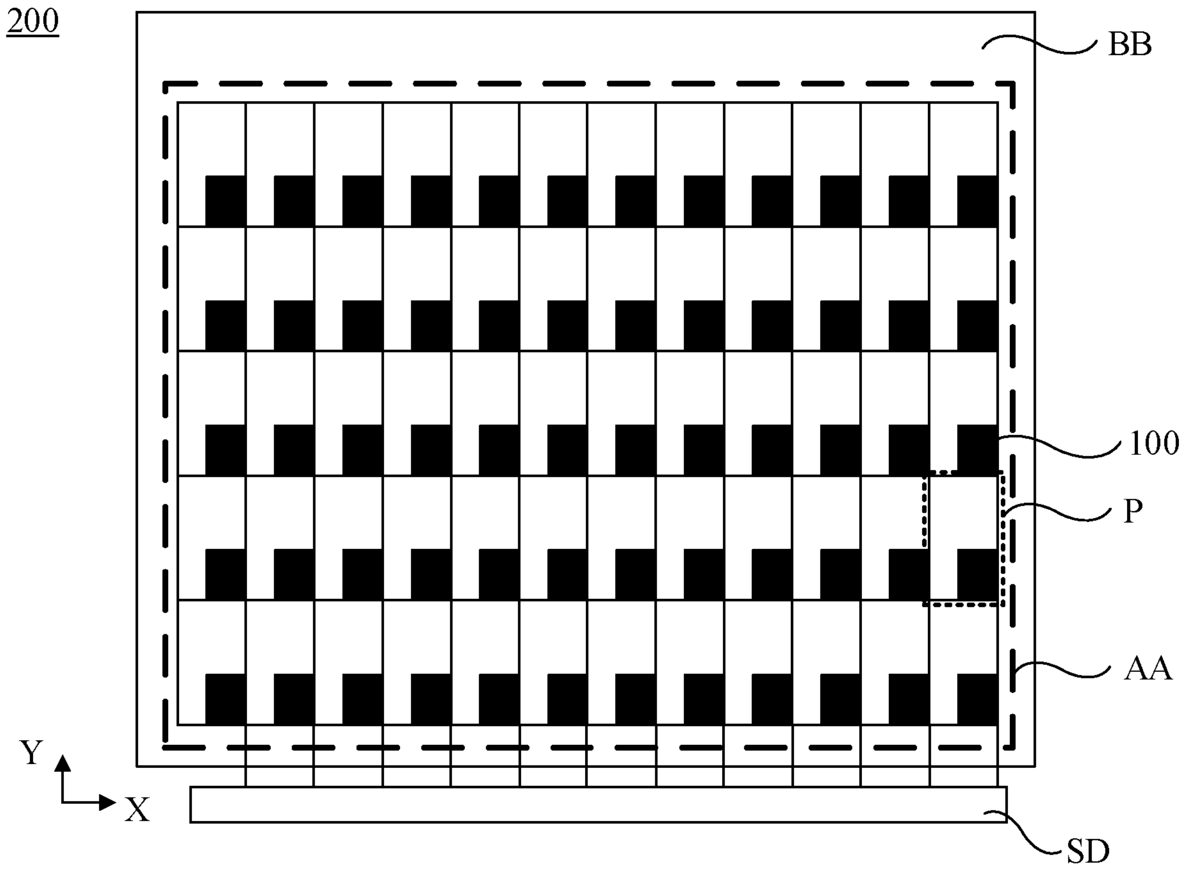
FIG. 8A is a structural diagram of a display panel, in accordance with some embodiments of the present disclosure.

As shown in FIG. 8A, some embodiments of the present disclosure provide a display panel 200. The display panel 200 includes a plurality of sub-pixels P. Each sub-pixel P is provided therein with the pixel driving circuit 100 as described above.

Beneficial effects achieved by the display panel 200 provided in some embodiments of the present disclosure include at least the same beneficial effects achieved by the display substrate provided by some embodiments above, which will not be repeated here.

For example, the display panel 200 has an active area AA and a peripheral area BB located on at least one side of the active area AA. The plurality of sub-pixels P are all disposed in the active area AA. FIG. 8 illustrates an example where the peripheral area BB surrounds the entire display area AA. It will be understood that the present disclosure is not limited thereto.

In some examples, the plurality of sub-pixels P include at least sub-pixels of a first color, sub-pixels of a second color and sub-pixels of a third color. For example, the first color, the second color and the third color may be three primary colors (e.g., red, green and blue).

For convenience, some embodiments of the present disclosure are described by taking an example in which the sub-pixels P are arranged in a matrix. In this case, sub-pixels P arranged in a line in a first direction (e.g., a horizontal direction X in FIG. 8A) are referred to as sub-pixels in a same row, and sub-pixels P arranged in a line in a second direction (e.g., a vertical direction Y in FIG. 8A) are referred to as sub-pixels in a same column.

Figure 8B:
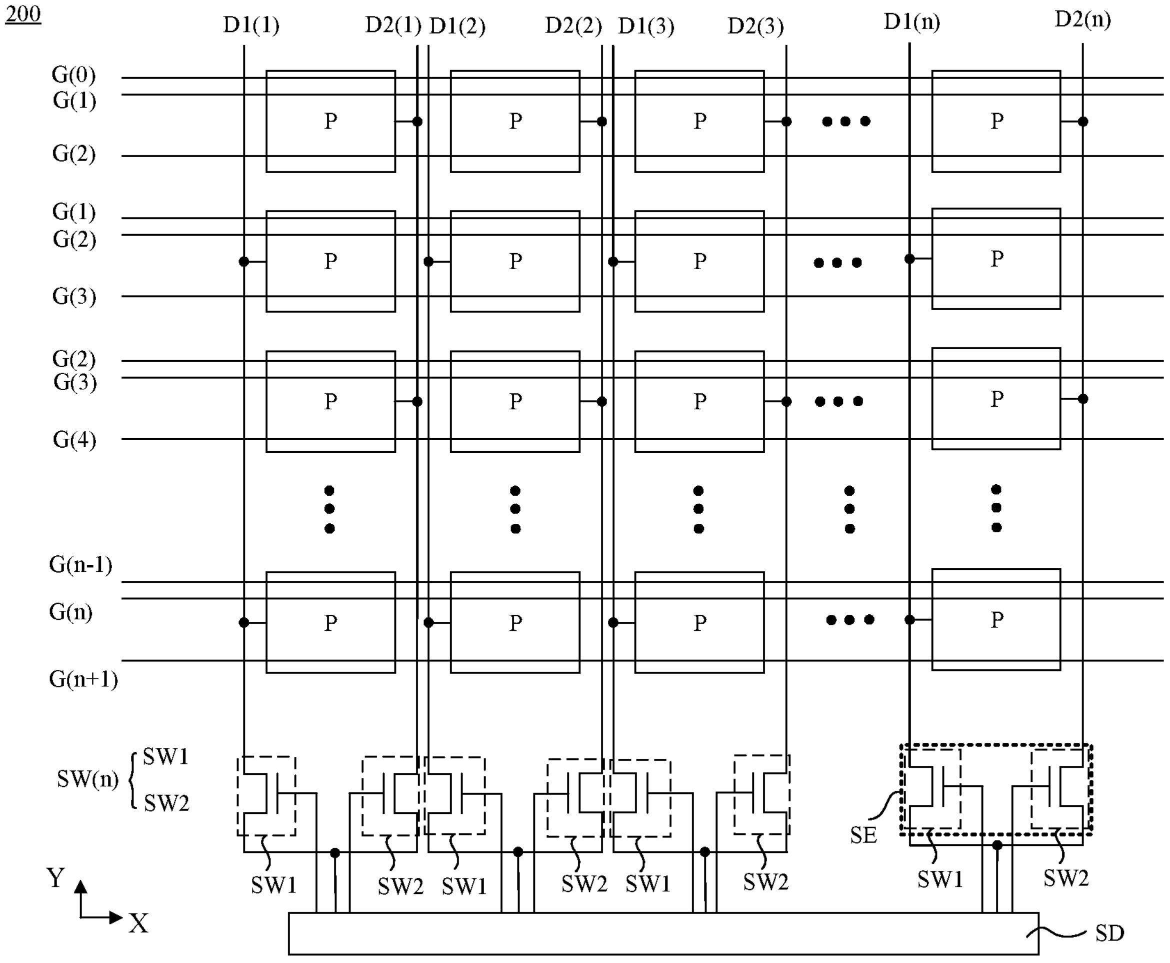
FIG. 8B is a structural diagram of another display panel, in accordance with some embodiments of the present disclosure.

In some examples, as shown in FIG. 8B, the display panel 200 further includes a plurality of scanning signal lines G(0), G(1) . . . G(n), a plurality of first data signal lines D1(1), D1(2) . . . D1 (*n*) and a plurality of second data signal lines D2(1), D2(2) . . . D2(*n*).

First control signal terminals GATE_n in pixel driving circuits 100 corresponding to a same row of sub-pixels P are connected to a same scanning signal line. Second control signal terminals GATE_(n−1) in the pixel driving circuits 100 corresponding to the same row of sub-pixels P are connected to a same scanning signal line. Third control signal terminals GATE_(n+1) in the pixel driving circuits 100 corresponding to the same row of sub-pixels P are connected to a same scanning signal line.

For example, for a certain row of sub-pixels P, in a case where first control signal terminals GATE_1 in pixel driving circuits 100 corresponding to the row of sub-pixels P are connected to a same scanning signal line G(1), second control signal terminals GATE_0 in the pixel driving circuits 100 corresponding to the row of the sub-pixels P are connected to a same scanning signal line G(0), and third control signal terminals GATE_2 in the pixel driving circuits 100 corresponding to the same row of sub-pixels P are connected to a same scanning signal line G(2).

Data signal terminals DATA in pixel driving circuits 100 corresponding to sub-pixels P of odd-numbered rows in a same column are coupled to a same first data signal line; and data signal terminals DATA in pixel driving circuits 100 corresponding to sub-pixels P of even-numbered rows in the same column are coupled to a same second data signal line.

For example, as shown in FIG. 8B, for a certain column of sub-pixels P, data signal terminals DATA in pixel driving circuits 100 corresponding to sub-pixels P of odd-numbered rows are coupled to a same first data signal line D1(1), and data signal terminals DATA in the pixel driving circuits 100 corresponding to sub-pixels P of the even-numbered rows are coupled to a same second data signal line D2(1).

It will be noted that, as for the "odd-numbered rows" and "even-numbered rows", a count may be performed from either end of the first data signal line D1(*n*) of the display panel 200. In a case where the display panel 200 includes a source driver SD, as shown in FIG. 8B, for ease of description, in some examples of the present disclosure, the count is performed from an end of the first data signal line D1 (*n*) proximate to the source driver SD to determine the "odd-numbered rows" and "even-numbered rows".

In some examples, with continued reference to FIG. 8B, the display panel 200 further includes the source driver SD and a plurality of switch controller groups SE. For example, a single switch controller group SE corresponds to a same column of sub-pixels P. Each switch controller group SE includes a first switch SW1 and a second switch SW2. An end of the first switch SW1 is coupled to a respective first data signal line, and the other end of the first switch SW1 is coupled to the source driver SD. An end of the second switch SW2 is coupled to a respective second data signal line, and the other end of the first switch SW1 is coupled to the source driver SD. The first switch SW1 and the second switch SW2 are turned on in different time periods.

In such a design, by connecting the first data signal line corresponding to the sub-pixels of the odd-numbered rows in the same column and the second data signal line corresponding to the sub-pixels of the even-numbered rows in the same column to a single switch controller group SE, and setting the switch controller group SE to include the first switch SW1 and the second switch SW2, a signal output by the source driver SD may be controlled to be written to the first data signal line or the second data signal line by controlling the first switch SW1 and the second switch SW2 to be turned on or turned off. In this way, it is possible to control a signal input to the first data signal line and a signal input to the second data signal line without increasing a number of source drivers. As a result, the reset voltage $V_{int}$ and the data voltage $V_{data}$ may be input to the pixel drive circuit through one signal terminal in different time periods, which may simplify a design of the circuit.

Figure 9:
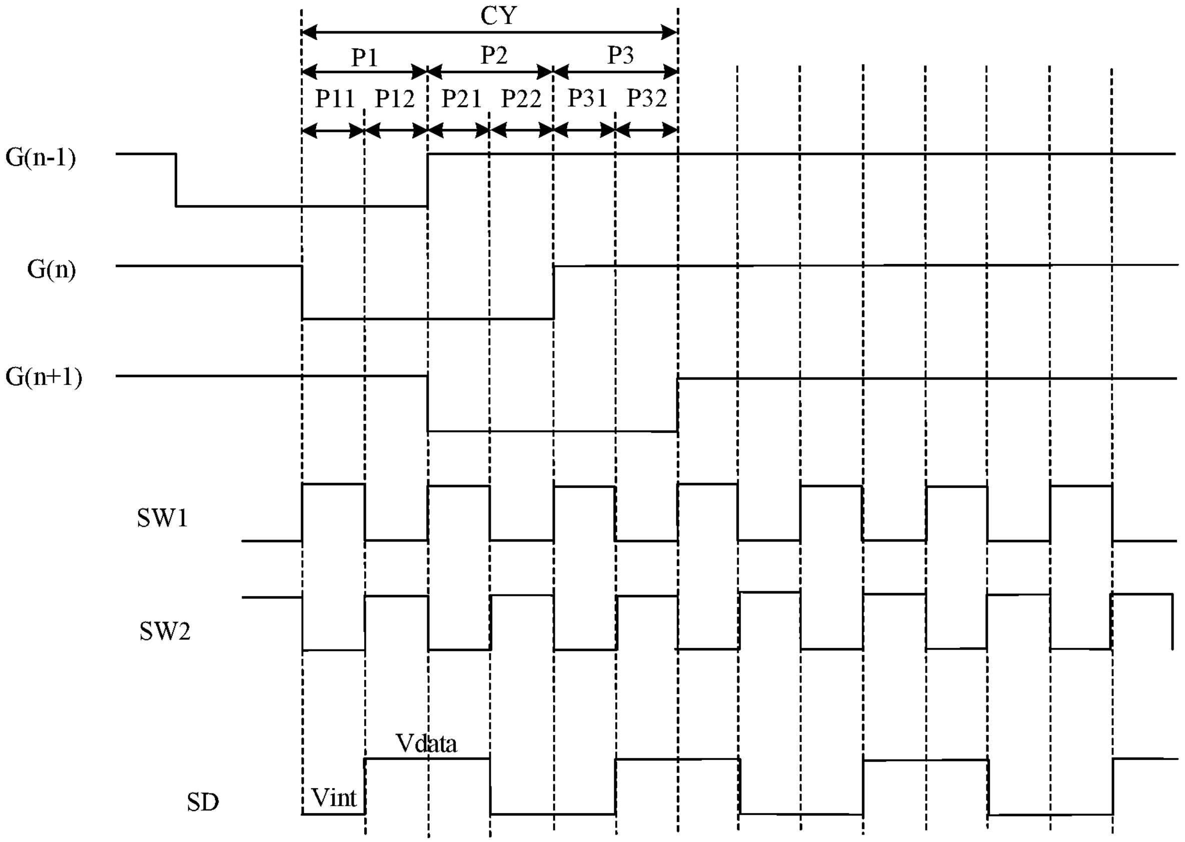
FIG. 9 is a timing diagram of a method for driving a display panel, in accordance with some embodiments of the present disclosure.

For example, with reference to FIGS. 8B and 9, when the first switch SW1 is turned on, and the second switch SW2 is turned off, the signal output by the source driver SD is only written to the first data signal line; and when the first switch SW1 is turned off, and the second switch SW2 is turned on, the signal output by the source driver SD is only written to the second data signal line. The signal output by the source driver may be the reset voltage $V_{int}$ or the data voltage $V_{data}$.

It will be noted that, the reset voltage $V_{int}$ may be the same as or different from the data voltage $V_{data}$. Specific settings of the two are subject to actual needs.

Figure 10:
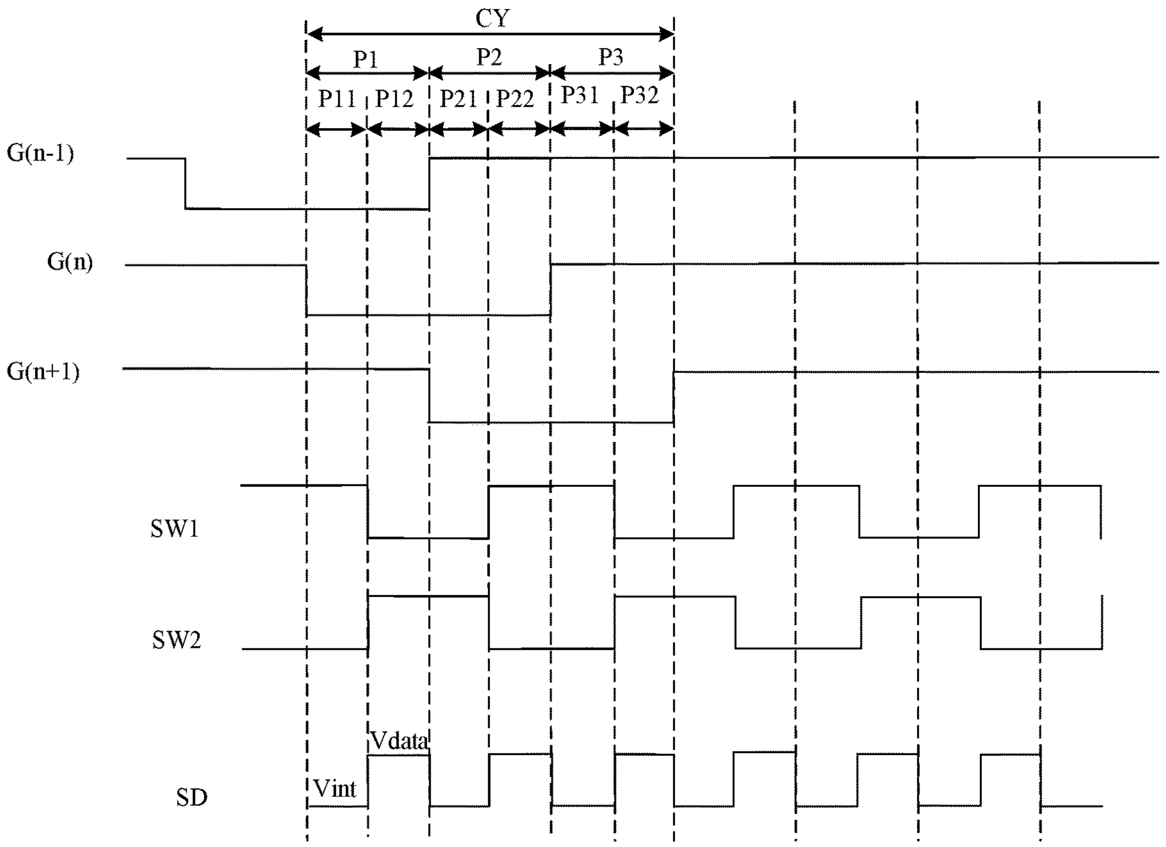
FIG. 10 is a timing diagram of another method for driving a display panel, in accordance with some embodiments of the present disclosure.

Some embodiments of the present disclosure provide a method for driving the display panel 200. As shown in FIGS. 9-10, the method includes a control method in a plurality of control cycles CY. Each control cycle CY includes a first stage P1, a second stage P2 and a third stage P3.

The display panel 200 includes the switch controller group SE, the source driver SD, the plurality of scanning signal lines G(0), G(1) . . . G(n), the plurality of first data signal lines D1(1), D1(2) . . . D1(*n*) and the plurality of second data signal lines D2(1), D2(2) . . . D2 (*n*).

In some examples, as shown in FIG. 9, the method for driving the display panel 200 in a single control cycle CY includes the following steps.

In the first stage P1, turn-on signals are input to the first control signal terminal GATE_n and the second control signal terminal GATE_(n−1). In a first sub-stage P11 of the first stage P1, the source driver controls the first switch SW1 to be turned off, controls the second switch SW2 to be turned on, and provides the initial voltage $V_{int}$ to a second end of the first switch SW1 and a second end of the second switch SW2. In a second sub-stage P12 of the first stage P1, the source driver controls the first switch SW1 to be turned on, controls the second switch SW2 to be turned off, and provides the data voltage $V_{data}$ to the second end of the first switch SW1 and the second end of the second switch SW2.

In the second stage P2, turn-on signals are input to the first control signal terminal GATE_n and the third control signal terminal GATE_(n+1). In a first sub-stage P21 of the second stage P2, the source driver controls the first switch SW1 to be turned off, controls the second switch SW2 to be turned on, and provides the data voltage $V_{data}$ to the second end of the first switch SW1 and the second end of the second switch SW2. In a second sub-stage P22 of the second stage P2, the source driver controls the first switch SW1 to be turned on, controls the second switch SW2 to be turned off, and provides the initial voltage $V_{int}$ to the second end of the first switch SW1 and the second end of the second switch SW2.

In the third stage P3, a turn-on signal is input to the third control signal terminal GATE_(n+1). In a first sub-stage P31 of the third stage P3, the source driver controls the first switch SW1 to be turned off, controls the second switch SW2 to be turned on, and provides the initial voltage $V_{int}$ to the second end of the first switch SW1 and the second end of the second switch SW2. In a second sub-stage of the third stage P32, the source driver controls the first switch SW1 to be turned on, controls the second switch SW2 to be turned off, and provides the Data voltage $V_{data}$ to the second end of the first switch SW1 and the second end of the second switch SW2.

In some other examples, as shown in FIG. 10, the method for driving the display panel 200 in the single control cycle includes the following steps.

In the first stage P1, the turn-on signals are input to the first control signal terminal GATE_n and the second control signal terminal GATE_(n−1). In the first sub-stage P11 of the first stage P1, the source driver controls the first switch SW1 to be turned off, controls the second switch SW2 to be turned on, and provides the initial voltage $V_{int}$ to the second end of the first switch SW1 and the second end of the second switch SW2. In the second sub-stage P12 of the first stage P1, the source driver controls the first switch SW1 to be turned on, controls the second switch SW2 to be turned off, and provides the data voltage $V_{data}$ to the second end of the first switch SW1 and the second end of the second switch SW2.

In the second stage P2, the turn-on signals are input to the first control signal terminal GATE_n and the third control signal terminal GATE_(n+1). In the first sub-stage P21 of the second stage P2, the source driver controls the first switch SW1 to be turned on, controls the second switch SW2 to be turned off, and provides the initial voltage $V_{int}$ to the second end of the first switch SW1 and the second end of the second switch SW2. In the second sub-stage P22 of the second stage P2, the source driver controls the first switch SW1 to be turned off, controls the second switch SW2 to be turned on, and provides the data voltage $V_{data}$ to the second end of the first switch SW1 and the second end of the second switch SW2.

In the third stage P3, the turn-on signal is input to the third control signal terminal GATE_(n+1). In the first sub-stage P31 of the third stage P3, the source driver controls the first switch SW1 to be turned off, controls the second switch SW2 to be turned on, and provides the initial voltage $V_{int}$ to the second end of the first switch SW1 and the second end of the second switch SW2. In the second sub-stage P32 of the third stage P3, the source driver controls the first switch SW1 to be turned on, controls the second switch SW2 to be turned off, and provides the data voltage $V_{data}$ to the second end of the first switch SW1 and the second end of the second switch SW2.

It will be noted that, the first switch SW1 and the second switch SW2 used in the display panel 200 provided in the embodiments of the present disclosure may be TFTs, field-effect transistors or other switching devices with same characteristics, which is not limited in the embodiments of the present disclosure.

On this basis, signals output by the source driver may be controlled to be transmitted to the first data signal lines D1(1), D1(2) . . . D1(*n*) or the second data signal lines D2(1), D2(2) . . . D2(*n*) by controlling first switches SW1 and second switches SW2 to be turned on or turned off. In this way, it is possible to control signals input to the first data signal lines D1(1), D1(2) . . . D1(*n*) and signals input to the second data signal lines D2(1), D2(2) . . . D2(*n*) without increasing a number of the signals output by the source driver, which simplifies the design of circuits.

Those having ordinary skill in the art will understand that, all or part of the steps for implementing the above method embodiments (e.g., the method for driving the pixel driving circuit 100 and the method for driving the display panel 200) may be completed by a hardware related to program instructions. The program may be stored on a computer-readable storage medium, and when the program is executed, the steps of the method embodiments are implemented. The storage medium includes a read-only memory (ROM), a random access memory (RAM), a magnetic disk, an optical disk and other mediums that can store program codes.

Figure 11:
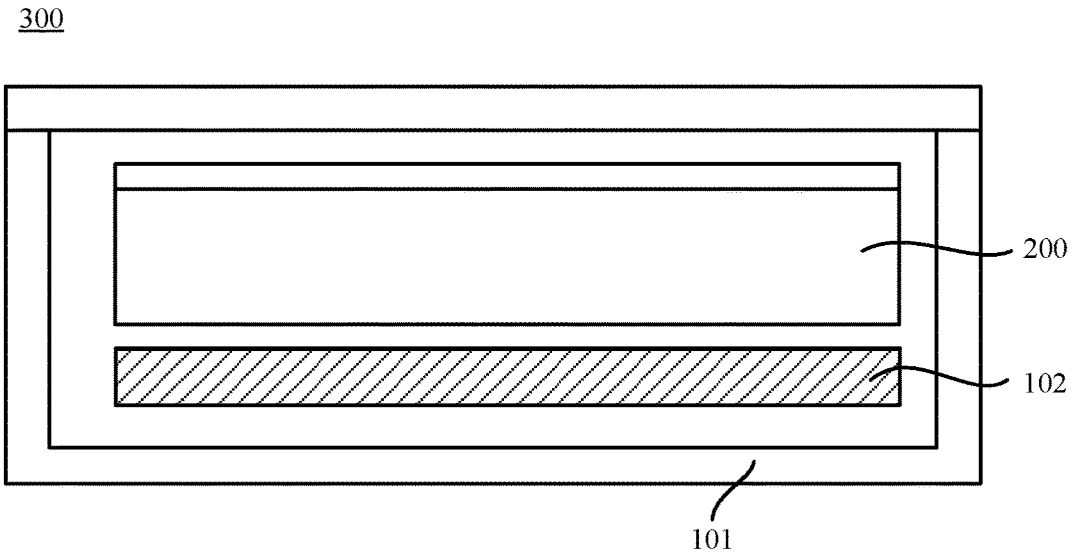
FIG. 11 is a structural diagram of a display apparatus, in accordance with some embodiments of the present disclosure.

As shown in FIG. 11, some embodiments of the present disclosure provide a display apparatus 300. The display apparatus 300 includes at least the display panel 200 described in any one of the above embodiments.

In some examples, with continued reference to FIG. 11, the display apparatus 300 further includes a frame 101 disposed outside the display panel 200, a circuit board 102 and a display driving integrated circuit (IC) that are disposed inside the frame 101, and others electronic accessories.

Beneficial effects that may be achieved by the display apparatus 300 provided in some embodiments of the present disclosure are the same as the beneficial effects that may be achieved by the display panel 200 provided in some embodiments of the present disclosure, which will not be repeated here.

The display apparatus 300 may be any apparatus that displays images whether in motion (e.g., videos) or stationary (e.g., still images) and whether text or images. The display apparatuses may be a mobile phone, a wireless apparatus, a personal data assistant (PDA), a hand-held or portable computer, a GPS receiver/navigator, a camera, an MP3 player, a video camera, a game console, a watch, a clock, a calculator, a television monitor, a flat panel display, a computer monitor, an automobile display (e.g., an odometer display), a navigator, a cockpit controller and/or display, a display of camera views (e.g., a display of a rear-view camera in a vehicle), an electronic photo, an electronic billboard or sign, a projector, a building structure, a packaging and aesthetic structure (e.g., a display for displaying an image of a piece of jewelry), etc.

It will be noted that, the display panel 200 may be a liquid crystal display (LCD) substrate, an organic light-emitting diode (OLED) display substrate, a quantum dot light-emitting diode (QLED) display substrate, which is not specifically limited in the present disclosure.

The foregoing descriptions are merely specific implementations of the present disclosure. However, the protection scope of the present disclosure is not limited thereto. Changes or replacements that any person skilled in the art could conceive of within the technical scope of the present disclosure shall be included in the protection scope of the present disclosure. Therefore, the protection scope of the present disclosure shall be subject to the protection scope of the claims.

What is claimed is:

1. A pixel driving circuit, comprising: a driving sub-circuit, a signal writing sub-circuit, a compensation sub-circuit, a light-emitting control sub-circuit and an initialization sub-circuit, wherein the signal writing sub-circuit is coupled to a data signal terminal, a first control signal terminal and the driving sub-circuit; the signal writing sub-circuit is configured to, under control of a signal from the first control signal terminal, write a voltage of the data signal terminal into the driving sub-circuit as a data voltage;

the light-emitting control sub-circuit is coupled to a light-emitting control terminal and the driving sub-circuit, and the light-emitting control sub-circuit is configured to be further coupled to a light-emitting device; the light-emitting control sub-circuit is further configured to, under control of a signal from the light-emitting control terminal, in conjunction with the driving sub-circuit, drive the light-emitting device to emit light;

the initialization sub-circuit is coupled to the data signal terminal, a second control signal terminal and the compensation sub-circuit; the initialization sub-circuit is configured to, under control of a signal from the second control signal terminal, transmit a voltage from the data signal terminal to the compensation sub-circuit as a reset voltage; and the compensation sub-circuit is further coupled to the driving sub-circuit and the first control signal terminal; the compensation sub-circuit is configured to, under the control of the signal from the first control signal terminal, transmit the reset voltage from the initialization sub-circuit to the driving sub-circuit to reset the driving sub-circuit, wherein the driving sub-circuit includes a driving transistor and a capacitor; a first end of the capacitor is coupled to a gate of the driving transistor and the compensation sub-circuit, and a second end of the capacitor is coupled to the signal writing sub-circuit; the signal writing sub-circuit is configured to, under the control of the signal from the first control signal terminal, write the voltage of the data signal terminal to the second end of the capacitor as the data voltage; and the compensation sub-circuit is configured to, under the control of the signal from the first control signal terminal, transmit the reset voltage from the initialization sub-circuit to the gate of the driving transistor to reset the gate of the driving transistor; and the compensation sub-circuit is further coupled to a third control signal terminal; the compensation sub-circuit is further configured to, under control of signals from the first control signal terminal and the third control signal terminal, write a threshold voltage of the driving transistor to the first end of the capacitor.

2. The pixel driving circuit according to claim 1, wherein the driving sub-circuit is further coupled to a first voltage terminal; and the light-emitting control sub-circuit is further coupled to a reference signal terminal and the second end of the capacitor, and is configured to be further coupled to an anode of the light-emitting device; the light-emitting control sub-circuit is further configured to, under the control of the signal of the light-emitting control terminal, transmit a reference voltage of the reference signal terminal to the second end of the capacitor, so as to drive the light-emitting device to emit light in conjunction with the driving sub-circuit.

3. The pixel driving circuit according to claim 1, wherein the driving sub-circuit is further coupled to a first voltage terminal; a first electrode of the driving transistor is coupled to the first voltage terminal, and a second electrode of the driving transistor is coupled to the light-emitting control sub-circuit.

4. The pixel driving circuit according to claim 1, wherein the signal writing sub-circuit includes a first transistor, wherein a gate of the first transistor is coupled to the first control signal terminal, a first electrode of the first transistor is coupled to the data signal terminal, and a second electrode of the first transistor is coupled to the second end of the capacitor.

5. The pixel driving circuit according to claim 1, wherein the compensation sub-circuit includes a second transistor and a third transistor, wherein a gate of the second transistor is coupled to the first control signal terminal, a first electrode of the second transistor is coupled to the first end of the capacitor, and a second electrode of the second transistor is coupled to the initialization sub-circuit; and a gate of the third transistor is coupled to the third control signal terminal, a first electrode of the third transistor is coupled to the second electrode of the second transistor, and a second electrode of the third transistor is coupled to a second electrode of the driving transistor.

6. The pixel driving circuit according to claim 1, wherein the light-emitting control sub-circuit is further coupled to a reference signal terminal; the light-emitting control sub-circuit includes a fourth transistor and a fifth transistor, wherein a gate of the fourth transistor is coupled to the light-emitting control terminal, a first electrode of the fourth transistor is coupled to the reference signal terminal, and a second electrode of the fourth transistor is coupled to the second end of the capacitor; and a gate of the fifth transistor is coupled to the light-emitting control terminal, a first electrode of the fifth transistor is coupled to a second electrode of the driving transistor, and a second electrode of the fifth transistor is coupled to an anode of the light-emitting device.

7. The pixel driving circuit according to claim 1, wherein the initialization sub-circuit includes a sixth transistor, wherein a gate of the sixth transistor is coupled to the second control signal terminal, a first electrode of the sixth transistor is coupled to the data signal terminal, and a second electrode of the sixth transistor is coupled to the compensation sub-circuit.

8. The pixel driving circuit according to claim 1, wherein the light-emitting control sub-circuit is further coupled to a reference terminal; the signal writing sub-circuit includes a first transistor, the compensation sub-circuit includes a second transistor and a third transistor, the light-emitting control sub-circuit includes a fourth transistor and a fifth transistor, and the initialization sub-circuit includes a sixth transistor, wherein a gate of the first transistor is coupled to the first control signal terminal, a first electrode of the first transistor is coupled to the data signal terminal, and a second electrode of the first transistor is coupled to the second end of the capacitor;

a gate of the second transistor is coupled to the first control signal terminal, a first electrode of the second transistor is coupled to the first end of the capacitor, and a second electrode of the second transistor is coupled to a second electrode of the sixth transistor;

a gate of the third transistor is coupled to the third control signal terminal, a first electrode of the third transistor is coupled to the second electrode of the second transistor, and a second electrode of the third transistor is coupled to a second electrode of the driving transistor;

a gate of the fourth transistor is coupled to the light-emitting control terminal, a first electrode of the fourth transistor is coupled to the reference signal terminal, and a second electrode of the fourth transistor is coupled to the second end of the capacitor;

a gate of the fifth transistor is coupled to the light-emitting control terminal, a first electrode of the fifth transistor is coupled to the second electrode of the driving transistor, and a second electrode of the fifth transistor is configured to be coupled to an anode of the light-emitting device; and a gate of the sixth transistor is coupled to the second control signal terminal, a first electrode of the sixth transistor is coupled to the data signal terminal, and the second electrode of the sixth transistor is coupled to the second electrode of the second transistor.

9. A display panel, comprising a plurality of sub-pixels, each sub-pixel including a respective pixel driving circuit according to claim 1.

10. The display panel according to claim 9, further comprising: a plurality of switch controller groups, a source driver, a plurality of scanning signal lines, a plurality of first data signal lines and a plurality of second data signal lines, wherein first control signal terminals of pixel driving circuits in a same row of sub-pixels are coupled to a same scanning signal line;

data signal terminals of pixel driving circuits in sub-pixels of odd-numbered rows in a same column are coupled to a same first data signal line, and data signal terminals of pixel driving circuits in sub-pixels of even-numbered rows in the same column are coupled to a same second data signal line; and each switch controller group includes a first switch and a second switch, an end of the first switch is coupled to a first data signal line, and another end of the first switch is coupled to the source driver; and an end of the second switch is coupled to a second data signal line, and another end of the second switch is coupled to the source driver.

11. A display apparatus, comprising:

the display panel according to claim 9.

12. A method for driving the pixel driving circuit according to claim 1, the light-emitting control sub-circuit being further coupled to a reference signal terminal the driving sub-circuit being further coupled to a first voltage terminal; the method having a plurality of frame periods;

each frame period including an initialization phase, a scanning phase and a light-emitting phase; the initialization phase including a plurality of row initialization periods, the scanning phase including a plurality of row scanning periods, the light-emitting phase including a plurality of row light-emitting periods; the method comprising:

in each of the plurality of row initialization periods:

transmitting, by the initialization sub-circuit, the voltage of the data signal terminal to the compensation sub-circuit as the reset voltage under control of a turn-on signal from the second control signal terminal; and transmitting, by the compensation sub-circuit, the received reset voltage to the gate of the driving transistor under control of a turn-on signal transmitted by the first control signal terminal, so as to reset the gate of the driving transistor;

in each of the plurality of row scanning periods:

writing, by the compensation sub-circuit, the threshold voltage of the driving transistor and a first voltage of the first voltage terminal into the first end of the capacitor under control of turn-on signals respectively transmitted by the first control signal terminal and the third control signal terminal; and writing, by the signal writing sub-circuit, the voltage of the data signal terminal to the second end of the capacitor as the data voltage under the control of the turn-on signal transmitted by the first control signal terminal; and in each of the plurality of row light-emitting periods:

writing, by the light-emitting control sub-circuit, a reference voltage of the reference signal terminal into the second end of the capacitor under control of a turn-on signal transmitted by the light-emitting control terminal, so as to write a voltage difference between the data voltage and the reference voltage to the first end of the capacitor due to an coupling action, and drive the light-emitting device to emit light.

13. A method for driving a display panel, the display panel being the display panel according to claim 9; the method for driving the display panel having a plurality of control cycles; each control cycle including a first stage, a second stage and a third stage; the display panel further including switch controller groups, a source driver, a plurality of scanning signal lines, a plurality of first data signal lines and a plurality of second data signal lines; each switch controller group including a first switch and a second switch; the compensation sub-circuit being further coupled to a third control signal terminal; the method for driving the display panel in a control cycle of the control cycles comprising:

in a first stage, inputting turn-on signals to the first control signal terminal and the second control signal terminal;

in a first sub-stage of the first stage, controlling, by the source driver, the first switch to be turned off and the second switch to be turned on, and providing, by the source driver, an initial voltage to a second end of the first switch and a second end of the second switch; and in a second sub-stage of the first stage, controlling, by the source driver, the first switch to be turned on and the second switch to be turned off, and providing, by the source driver, the data voltage to the second end of the first switch and the second end of the second switch;

in a second stage, inputting turn-on signals to the first control signal terminal and the third control signal terminal;

in a first sub-stage of the second stage, controlling, by the source driver, the first switch to be turned off and the second switch to be turned on, and providing, by the source driver, the data voltage to the second end of the first switch and the second end of the second switch; and in a second sub-stage of the second stage, controlling, by the source driver, the first switch to be turned on and the second switch to be turned off, and providing, by the source driver, the initial voltage to the second end of the first switch and the second end of the second switch; and in a third stage, inputting the turn-on signal to the third control signal terminal;

in a first sub-stage of the third stage, controlling, by the source driver, the first switch to be turned off and the second switch to be turned on, and providing, by the source driver, the initial voltage to the second end of the first switch and the second end of the second switch; and in a second sub-stage of the third stage, controlling, by the source driver, the first switch to be turned on and the second switch to be turned off, and providing, by the source driver, the data voltage to the second end of the first switch and the second end of the second switch.

14. A method for driving a display panel, the display panel including the display panel according to claim 9; the method for driving the display panel having a plurality of control cycles; each control cycle including a first stage, a second stage and a third stage; the display panel further including switch controller groups, a source driver, a plurality of scanning signal lines, a plurality of first data signal lines and a plurality of second data signal lines; each switch controller group including a first switch and a second switch; the compensation sub-circuit being further coupled to a third control signal terminal; the method for driving the display panel in a control cycle of the control cycles comprising:

in a first stage, inputting turn-on signals to a first control signal terminal and a second control signal terminal;

in a first sub-stage of the first stage, controlling, by the source driver, a first switch to be turned off and a second switch to be turned on, and providing, by the source driver, an initial voltage to a second end of the first switch and a second end of the second switch; and in a second sub-stage of the first stage, controlling, by the source driver, the first switch to be turned on and the second switch to be turned off, and providing, by the source driver, the data voltage to the second end of the first switch and the second end of the second switch;

in a second stage, inputting turn-on signals to the first control signal terminal and the third control signal terminal;

in a first sub-stage of the second stage, controlling, by the source driver, the first switch to be turned on and the second switch to be turned off, and providing, by the source driver, the initial voltage to the second end of the first switch and the second end of the second switch; and in a second sub-stage of the second stage, controlling, by the source driver, the first switch to be turned off and the second switch to be turned on, and providing, by the source driver, the data voltage to the second end of the first switch and the second end of the second switch; and in a third stage, inputting the turn-on signal to the third control signal terminal;

in a first sub-stage of the third stage, controlling, by the source driver, the first switch to be turned off and the second switch to be turned on, and providing, by the source driver, the initial voltage to the second end of the first switch and the second end of the second switch; and in a second sub-stage of the third stage, controlling, by the source driver, the first switch to be turned on and the second switch to be turned off, and providing, by the source driver, the data voltage to the second end of the first switch and the second end of the second switch.

15. The pixel driving circuit according to claim 8, wherein the driving transistor, the first transistor, the second transistor, the third transistor, the fourth transistor, the fifth transistor and the sixth transistor are enhanced P-type thin film transistors.

16. The pixel driving circuit according to claim 8, wherein the light-emitting control terminal and the first control signal terminal are configured to transmit opposite signals.

17. The pixel driving circuit according to claim 16, wherein a type of the first transistor and the second transistor is different from a type of the fourth transistor and the fifth transistor.

18. A method for driving a display panel, the display panel including a plurality of sub-pixels; each sub-pixel including a respective pixel driving circuit; the pixel driving circuit including a driving sub-circuit, a signal writing sub-circuit, a compensation sub-circuit, a light-emitting control sub-circuit and an initialization sub-circuit; the signal writing sub-circuit being coupled to a data signal terminal, a first control signal terminal and the driving sub-circuit; the light-emitting control sub-circuit being coupled to a light-emitting control terminal and the driving sub-circuit, and the light-emitting control sub-circuit being configured to be further coupled to a light-emitting device; the initialization sub-circuit being coupled to the data signal terminal, a second control signal terminal and the compensation sub-circuit; the compensation sub-circuit being further coupled to the driving sub-circuit and the first control signal terminal;

the method for driving the display panel having a plurality of control cycles; each control cycle including a first stage, a second stage and a third stage;

the display panel further including switch controller groups, a source driver, a plurality of scanning signal lines, a plurality of first data signal lines and a plurality of second data signal lines; each switch controller group including a first switch and a second switch; the compensation sub-circuit being further coupled to a third control signal terminal;

the method for driving the display panel in a control cycle of the control cycles comprising:

in a first stage, inputting turn-on signals to the first control signal terminal and the second control signal terminal;

in a first sub-stage of the first stage, controlling, by the source driver, the first switch to be turned off and the second switch to be turned on, and providing, by the source driver, an initial voltage to a second end of the first switch and a second end of the second switch; and in a second sub-stage of the first stage, controlling, by the source driver, the first switch to be turned on and the second switch to be turned off, and providing, by the source driver, the data voltage to the second end of the first switch and the second end of the second switch;

in a second stage, inputting turn-on signals to the first control signal terminal and the third control signal terminal;

in a first sub-stage of the second stage, controlling, by the source driver, the first switch to be turned off and the second switch to be turned on, and providing, by the source driver, the data voltage to the second end of the first switch and the second end of the second switch; and in a second sub-stage of the second stage, controlling, by the source driver, the first switch to be turned on and the second switch to be turned off, and providing, by the source driver, the initial voltage to the second end of the first switch and the second end of the second switch; and in a third stage, inputting the turn-on signal to the third control signal terminal;

in a first sub-stage of the third stage, controlling, by the source driver, the first switch to be turned off and the second switch to be turned on, and providing, by the source driver, the initial voltage to the second end of the first switch and the second end of the second switch; and in a second sub-stage of the third stage, controlling, by the source driver, the first switch to be turned on and the second switch to be turned off, and providing, by the source driver, the data voltage to the second end of the first switch and the second end of the second switch.

19. A method for driving a display panel, the display panel including a plurality of sub-pixels; each sub-pixel including a respective pixel driving circuit; the pixel driving circuit including a driving sub-circuit, a signal writing sub-circuit, a compensation sub-circuit, a light-emitting control sub-circuit and an initialization sub-circuit; the signal writing sub-circuit being coupled to a data signal terminal, a first control signal terminal and the driving sub-circuit; the light-emitting control sub-circuit being coupled to a light-emitting control terminal and the driving sub-circuit, and the light-emitting control sub-circuit being configured to be further coupled to a light-emitting device; the initialization sub-circuit being coupled to the data signal terminal, a second control signal terminal and the compensation sub-circuit; the compensation sub-circuit being further coupled to the driving sub-circuit and the first control signal terminal;

the method for driving the display panel having a plurality of control cycles; each control cycle including a first stage, a second stage and a third stage;

the display panel further including switch controller groups, a source driver, a plurality of scanning signal lines, a plurality of first data signal lines and a plurality of second data signal lines; each switch controller group including a first switch and a second switch; the compensation sub-circuit being further coupled to a third control signal terminal;

the method for driving the display panel in a control cycle of the control cycles comprising:

in a first stage, inputting turn-on signals to a first control signal terminal and a second control signal terminal;

in a first sub-stage of the first stage, controlling, by the source driver, a first switch to be turned off and a second switch to be turned on, and providing, by the source driver, an initial voltage to a second end of the first switch and a second end of the second switch; and in a second sub-stage of the first stage, controlling, by the source driver, the first switch to be turned on and the second switch to be turned off, and providing, by the source driver, the data voltage to the second end of the first switch and the second end of the second switch;

in a second stage, inputting turn-on signals to the first control signal terminal and the third control signal terminal;

in a first sub-stage of the second stage, controlling, by the source driver, the first switch to be turned on and the second switch to be turned off, and providing, by the source driver, the initial voltage to the second end of the first switch and the second end of the second switch; and in a second sub-stage of the second stage, controlling, by the source driver, the first switch to be turned off and the second switch to be turned on, and providing, by the source driver, the data voltage to the second end of the first switch and the second end of the second switch; and in a third stage, inputting the turn-on signal to the third control signal terminal;

in a first sub-stage of the third stage, controlling, by the source driver, the first switch to be turned off and the second switch to be turned on, and providing, by the source driver, the initial voltage to the second end of the first switch and the second end of the second switch; and in a second sub-stage of the third stage, controlling, by the source driver, the first switch to be turned on and the second switch to be turned off, and providing, by the source driver, the data voltage to the second end of the first switch and the second end of the second switch.

* * * * *